(12) United States Patent
Katayama

(10) Patent No.: US 9,186,992 B2
(45) Date of Patent: Nov. 17, 2015

(54) WALKING ASSISTANCE MOVING VEHICLE

(71) Applicant: Funai Electric Co., Ltd., Daito, Osaka (JP)

(72) Inventor: Takahiro Katayama, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 14/466,225

(22) Filed: Aug. 22, 2014

(65) Prior Publication Data
US 2015/0060175 A1 Mar. 5, 2015

(30) Foreign Application Priority Data

Aug. 30, 2013 (JP) ................................. 2013-180574

(51) Int. Cl.
*B60K 28/16* (2006.01)
*A61H 3/04* (2006.01)
*B60L 3/10* (2006.01)
(Continued)

(52) U.S. Cl.
CPC *B60K 28/16* (2013.01); *A61H 3/04* (2013.01); *B60L 3/104* (2013.01); *B60L 11/1805* (2013.01); *B60L 15/2036* (2013.01); *B62D 51/04* (2013.01); *A61H 2003/043* (2013.01); *A61H 2201/1207* (2013.01); *A61H 2201/1635* (2013.01); *A61H 2201/5007* (2013.01); *A61H 2201/5061* (2013.01); *A61H 2201/5069* (2013.01); *A61H 2201/5079* (2013.01); *A61H 2201/5084* (2013.01); *B60L 2220/44* (2013.01); *B60L 2240/12* (2013.01); *B60L 2240/16* (2013.01); *B60L 2240/20* (2013.01); *B60L 2240/421* (2013.01); *B60L 2240/423* (2013.01); *B60L 2240/429* (2013.01);

(Continued)

(58) Field of Classification Search
CPC ........ B62D 1/04; B62D 51/001; B62D 11/04; B62B 5/0073
See application file for complete search history.

(56) References Cited

U.S. PATENT DOCUMENTS 6,536,544 B1 * 3/2003 Egawa et al. ................. 180/19.3
8,892,311 B2 * 11/2014 Lewis .............................. 701/42
(Continued)

FOREIGN PATENT DOCUMENTS

| DE | 19614411 A1 | 10/1996 |
|---|---|---|
| EP | 2383163 A1 | 11/2011 |
| JP | 2002-037120 A | 2/2002 |

OTHER PUBLICATIONS

Extended European Search Report of the corresponding European Application No. 14182378.1, dated May 18, 2015.

*Primary Examiner* — Kevin Hurley
(74) *Attorney, Agent, or Firm* — Global IP Counselors, LLP

(57) ABSTRACT

A walking assistance moving vehicle includes a walking assistance moving vehicle main body with a pair of drive wheels, a drive wheel rotational speed sensor, a turning sensor, and a controller. The drive wheel rotational speed sensor senses drive wheel rotational speed of each of the drive wheels. The turning sensor directly senses at least one of a first lateral acceleration and a first turning angular velocity. The controller indirectly acquires at least one of a second lateral acceleration and a second turning angular velocity based on the drive wheel rotational speed sensed by the drive wheel rotational speed sensor. The controller performs a first control to decelerate or stop drive of the drive wheels based on a comparison of the first turning angular velocity and the second turning angular velocity or a comparison of the first lateral acceleration and the second lateral acceleration.

8 Claims, 20 Drawing Sheets

(51) Int. Cl.
  *B62D 51/04* (2006.01)
  *B60L 11/18* (2006.01)
  *B60L 15/20* (2006.01)
(52) U.S. Cl.
  CPC ..... *B60L 2240/461* (2013.01); *B60L 2240/647* (2013.01); *B60Y 2400/304* (2013.01); *B60Y 2400/3032* (2013.01)

(56) References Cited

U.S. PATENT DOCUMENTS

| | | |
|---|---|---|
| 2002/0079155 A1 | 6/2002 | Andonian et al. |
| 2014/0345956 A1* | 11/2014 | Kojina ............................ 180/6.5 |
| 2014/0358344 A1* | 12/2014 | Katayama ...................... 701/22 |
| 2015/0066277 A1* | 3/2015 | Kojina ........................... 701/22 |

* cited by examiner

FIRST EMBODIMENT

FIRST EMBODIMENT

TURNING OPERATION

FIRST EMBODIMENT
FREEWHEELING OPERATION

WHEN TURNING IN UNINTENDED DIRECTION

THIRD EMBODIMENT
BOTH DRIVE WHEELS ON GROUND

WALKING ASSISTANCE MOVING VEHICLE

CROSS-REFERENCE TO RELATED APPLICATIONS

This application claims priority to Japanese Patent Application No. 2013-180574 filed on Aug. 30, 2013. The entire disclosure of Japanese Patent Application No. 2013-180574 is hereby incorporated herein by reference.

BACKGROUND

1. Field of the Invention

The present invention generally relates to a walking assistance moving vehicle. More specifically, the present invention relates to a walking assistance moving vehicle with a drive wheel rotational speed sensor.

2. Background Information

A walking assistance moving vehicle having a drive wheel rotational speed sensor is known in the art (see Japanese Unexamined Patent Application Publication No. 2002-37120 (Patent Literature 1), for example).

The above-mentioned Patent Literature 1 discloses an omnidirectional movement type of cart having four drive wheels and a speed sensing means for monitoring the rotational speed of the four drive wheels. This omnidirectional cart performs control to determine whether or not the drive wheels are freewheeling from a sensing value obtained by the speed sensing means.

SUMMARY

However, it has been discovered that when the configuration in which the sensing value obtained with the speed sensing means is used to determine whether or not the drive wheels are freewheeling, as with the omnidirectional cart of the above-mentioned Patent Literature 1, is applied to a walking assistance moving vehicle with a pair of drive wheels, it is difficult to distinguish between the freewheeling of one of the drive wheels and the turning of the walking assistance moving vehicle since one of the drive wheels is mainly rotating during the turning. Accordingly, it is conceivable that the walking assistance moving vehicle may turn in a direction not intended by the user.

This invention is conceived in light of the above-mentioned problem. One object is to provide a walking assistance moving vehicle with which freewheeling of drive wheels is accurately detected. Also, another object is to provide a walking assistance moving vehicle with which it less likely that a walking assistance moving vehicle main body will turn in a direction not intended by a user.

In view of the state of the known technology, a walking assistance moving vehicle includes a walking assistance moving vehicle main body with a pair of drive wheels, a drive wheel rotational speed sensor, a turning sensor, and a controller. The walking assistance moving vehicle main body is configured to assist walking of a user. The drive wheel rotational speed sensor is configured to sense drive wheel rotational speed of each of the drive wheels. The turning sensor is configured to directly sense at least one of a first lateral acceleration and a first turning angular velocity during turning of the walking assistance moving vehicle main body. The controller is configured to indirectly acquire at least one of a second lateral acceleration and a second turning angular velocity of the walking assistance moving vehicle main body based on the drive wheel rotational speed sensed by the drive wheel rotational speed sensor. The controller is further configured to perform a first control to decelerate or stop drive of the drive wheels based on a comparison of the first turning angular velocity and the second turning angular velocity or a comparison of the first lateral acceleration and the second lateral acceleration.

Also other objects, features, aspects and advantages of the present disclosure will become apparent to those skilled in the art from the following detailed description, which, taken in conjunction with the annexed drawings, discloses one embodiment of the walking assistance moving vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Referring to FIGS. 1 to 8, a walking assistance moving vehicle 100 is illustrated in accordance with a first embodiment. In the following description, the front in the user's forward movement direction (the arrow X1 direction) will be referred to as the front, the rear in the movement direction (the arrow X2 direction) will be referred to as the rear, the right side with respect to the movement direction (the arrow Y1 direction) will be referred to as the right side, the left side with respect to the movement direction (the arrow Y2 direction) will be referred to as the left side, the upper side in the vertical direction (the arrow Z1 direction) will be referred to as the upper side, and the ground side (the arrow Z2 direction) will be referred to as the lower side. Thus, in the illustrated embodiment, the movement of the walking assistance moving vehicle 100 in the X1 direction is also referred as a forward movement, while the movement of the walking assistance moving vehicle 100 in the X2 direction is also refereed as a rearward movement. Similarly, the walking of the user U in the X1 direction is also referred as a forward walking of the user U, while the walking of the user U in the X2 direction is also refereed as a rearward walking of the user U. Also, the X direction is parallel to the longitudinal direction of the walking assistance moving vehicle 100, while the Y direction is parallel to the lateral direction of the walking assistance moving vehicle 100. The X and Y directions are perpendicular to each other. The Z direction is parallel to the vertical direction, and perpendicular to the X and Y directions.

Figure 1:
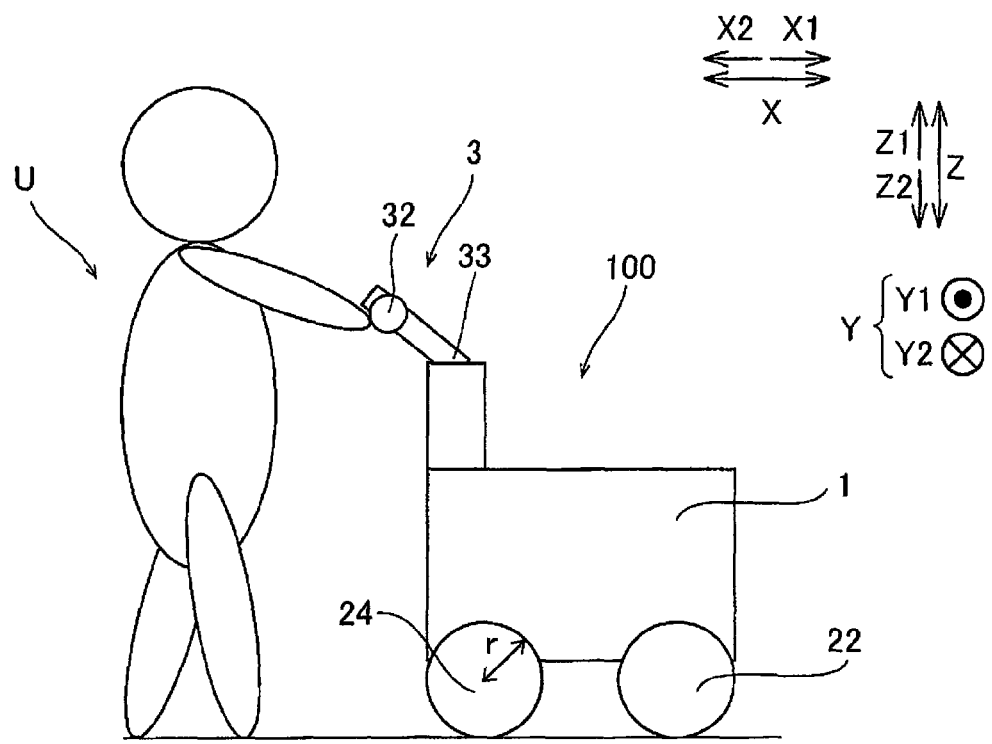
FIG. 1 is a side elevational view of a walking assistance moving vehicle in accordance with a first embodiment.
Figure 2:
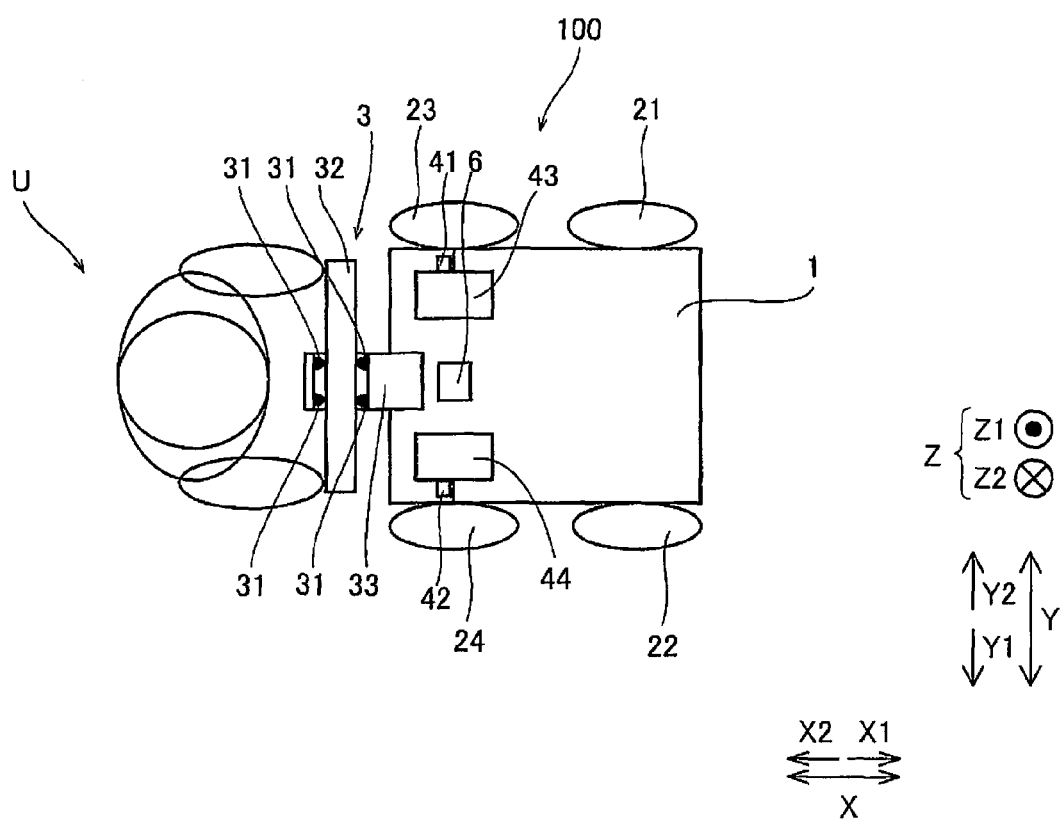
FIG. 2 is a top plan view of the walking assistance moving vehicle in accordance with the first embodiment.

As shown in FIGS. 1 and 2, the walking assistance moving vehicle 100 in this first embodiment includes a walking assistance moving vehicle main body 1, a pair of left and right casters 21 and 22, a pair of left and right drive wheels 23 and 24, and a handle component 3. More specifically, the casters 21 and 22 are movable in all directions, and is rotatably mounted to the front lower portions of the walking assistance moving vehicle main body 1, respectively. The drive wheels 23 and 24 is provided for moving the walking assistance moving vehicle 100. The handle component 3 extends in a rod shape from the center portion on the rear upper portion of the walking assistance moving vehicle main body 1. The upper part of the handle component 3 is formed in the shape of a rod that branches off to the left and right (e.g., a T-shape). The casters 21 and 22 are an example of the "free wheels" of the present invention. In the illustrated embodiment, the casters 21 and 22 can include the so-called swivel casters. However, the casters 21 and 22 can be different type of casters, such as rigid casters and the like.

In the illustrated embodiment, the walking assistance moving vehicle 100 is a manually propulsion vehicle, such as a hand cart, a walking assist cart, a wheeled walker or a rollator, that serves both to assist the user (primarily an elderly person with limited mobility) and to function as a chair for resting on and a basket for carrying things. However, the present invention can also be equally applied to strollers, push or pull carts, wheeled walkers, wheeled canes, wheelchairs, and so forth. Also, the walking assistance moving vehicle 100 is basically a manually propelled device that is pushed or pulled by a person, and also include the drive motors, as described below. However, the walking assistance moving vehicle 100 can include other type of a prime mover, such as an engine.

As shown in FIG. 2, in the first embodiment, the handle component 3 is gripped by the user U. The handle component 3 includes four pressure sensors 31 that sense drive force of the user U with which the walking assistance moving vehicle main body 1 is pushed or pulled by the user U, and a drive direction of the drive force in which the walking assistance moving vehicle main body 1 is pushed or pulled by the user U. More specifically, the handle component 3 includes a grip component 32 that is formed in a rod shape and can be gripped by the user, and a rod-shaped neck component 33 that connects the grip component 32 to the walking assistance moving vehicle main body 1. The neck component 33 is fixedly coupled to the walking assistance moving vehicle main body 1. Four of the pressure sensors 31 are disposed between the grip component 32 and the neck component 33, and electro-conductive rubber is disposed at the contact portion between the grip component 32 and the neck component 33. When the user U grips and pushes or pulls the grip component 32, this pressure is transferred to the pressure sensors 31. For example, if the left side of the grip component 32 is pushed forward by the user U, then the left-front pressure sensor 31 will be compressed, and the pressure will be sensed. The pressure sensors 31 are an example of the "assist force adjustment degree sensor" of the present invention.

Figure 3:
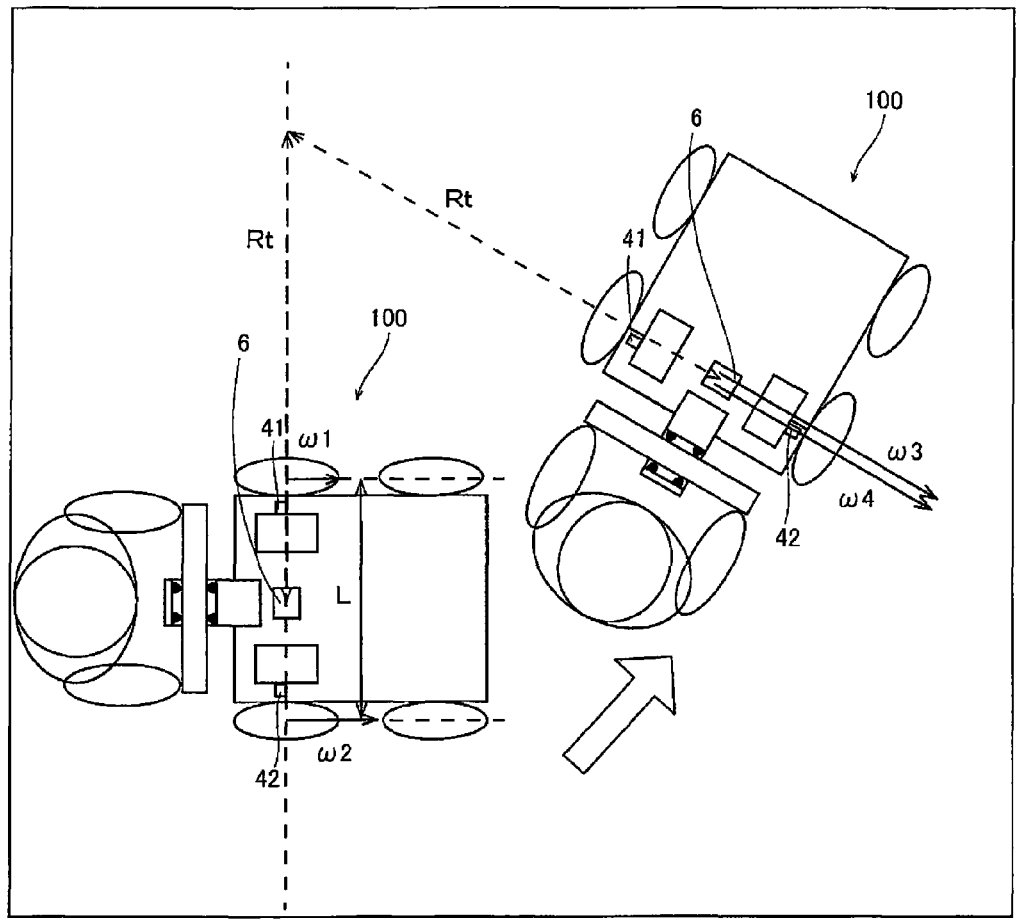
FIG. 3 is a schematic diagram illustrating how a turning angular velocity of the walking assistance moving vehicle in accordance with the first embodiment is acquired.
Figure 4:
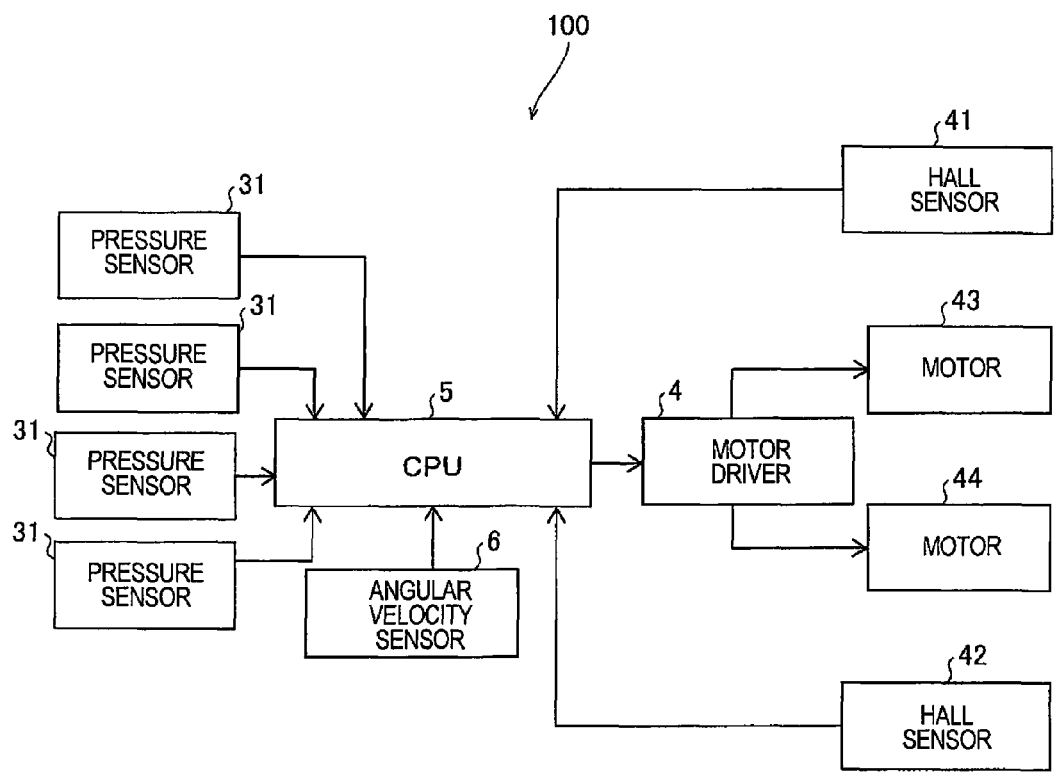
FIG. 4 is a block diagram of the configuration of the walking assistance moving vehicle in accordance with the first embodiment.

As shown in FIGS. 3 and 4, in the first embodiment, Hall sensors 41 and 42 for sensing the drive wheel rotational speeds ω1 and ω2 of the drive wheels 23 and 24 are provided to motors 43 and 44, respectively. More specifically, the drive wheel 23 is rotated in the forward or rearward direction by the motor 43 provided on the left-rear side inside the walking assistance moving vehicle main body 1. The drive wheel rotational speed ω1 of the drive wheel 23 is sensed by the Hall sensor 41 provided to the motor 43. Similarly, the drive wheel 24 is rotated in the forward or rearward direction by the motor 44 provided on the right-rear side inside the walking assistance moving vehicle main body 1. The drive wheel rotational speed ω2 of the drive wheel 24 is sensed by the Hall sensor 42 provided to the motor 44. The Hall sensors 41 and 42 are an example of the "drive wheel rotational speed sensor" of the present invention.

As shown in FIG. 4, a CPU (central processing unit) 5, a motor driver 4, and the motors 43 and 44 are provided inside the walking assistance moving vehicle main body 1. In the first embodiment, the CPU 5 performs control to drive the drive wheels 23 and 24 in the direction in which the user U pushes or pulls the walking assistance moving vehicle main body 1, based on information from the pressure sensors 31. More specifically, information is acquired about the amount of pressure produced when the user U pushes or pulls the grip component 32 (sensed by the pressure sensors 31), and information related to the direction according to the difference in the sensing values of the four pressure sensors 31 is acquired. For example, if the two pressure sensors 31 provided on the front are pressed at the same pressure, and the pressure on the two pressure sensors 31 provided at the rear is zero, then the CPU 5 calculates an amount of current to be sent to the motors 43 and 44 so that the same torque will be produced by the drive wheels 23 and 24 in the forward direction. The configuration is such that the pressure and torque values are in a proportional relation. The CPU 5 is an example of the "controller" of the present invention. Of course, the controller of the present invention can be different type of controller. For example, in the illustrated embodiment, the controller can include a microprocessor or a microcomputer with a control program that controls various components of the walking assistance moving vehicle 100. The controller can also include other conventional components such as an input interface circuit, an output interface circuit, and storage devices such as a ROM (Read Only Memory) device and a RAM (Random Access Memory) device. The microcomputer of the controller is programmed to control the various components of the walking assistance moving vehicle 100. The memory circuit stores processing results and control programs that are run by the microcomputer. The internal RAM of the controller stores statuses of operational flags and various control data. The internal ROM of the controller stores the programs for various operations. The controller is capable of selectively controlling any of the components of the walking assistance moving vehicle 100 in accordance with the control program. It will be apparent to those skilled in the art from this disclosure that the precise structure and algorithms for the controller can be any combination of hardware and software that will carry out the functions of the present invention.

As shown in FIG. 4, the CPU 5 outputs information about the calculated current value to the motor driver 4. The motor driver 4 sends current to the motors 43 and 44 based on the acquired information about the current value. The motors 43 and 44 rotates the drive wheels 23 and 24, respectively. The CPU 5 acquires the drive wheel rotational speeds $\omega_1$ and $\omega_2$ sensed by the Hall sensors 41 and 42 provided to the motors 43 and 44.

Figure 5:
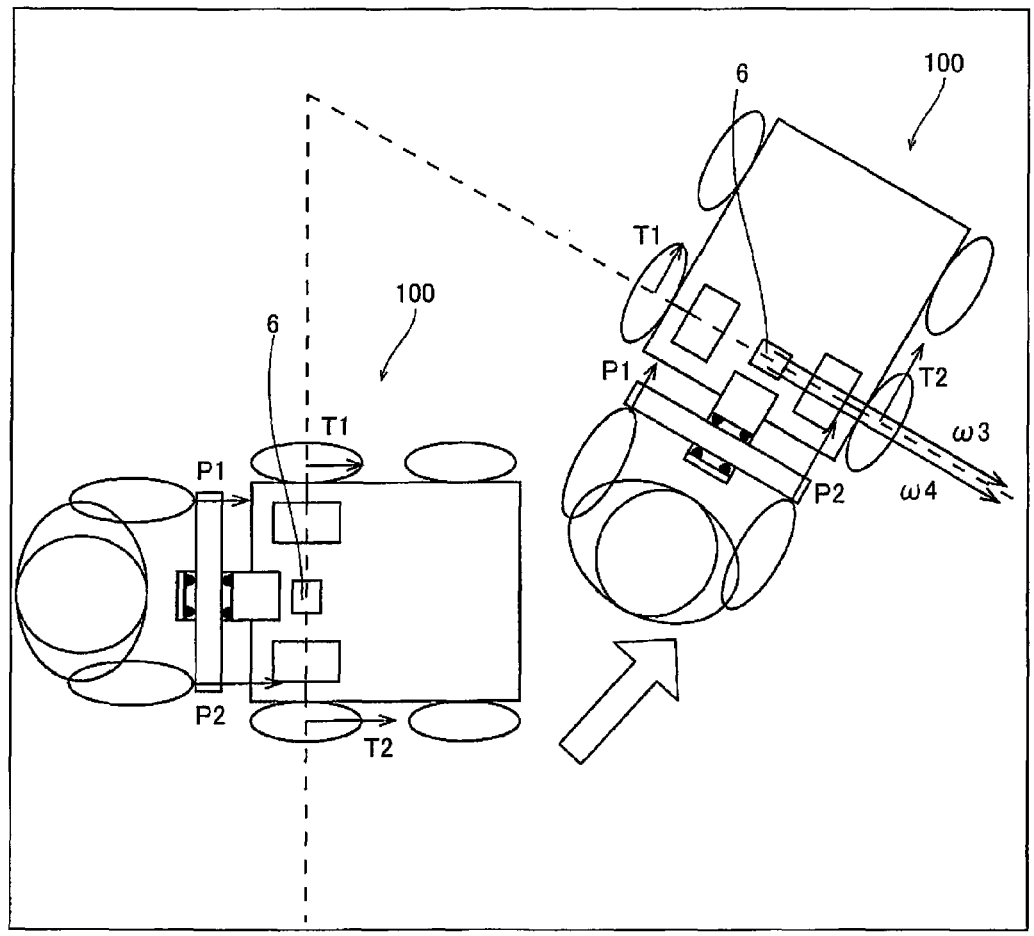
FIG. 5 is a schematic diagram illustrating a turning operation of the walking assistance moving vehicle in accordance with the first embodiment.

As shown in FIG. 5, in the first embodiment, an angular velocity sensor 6 is disposed on the inside of the walking assistance moving vehicle main body 1. The angular velocity sensor 6 directly senses a first turning angular velocity $\omega_3$ during turning of the walking assistance moving vehicle main body 1. The angular velocity sensor 6 senses the first turning angular velocity $\omega_3$, which is the turning angular velocity in a direction around the Z axis, and inputs the sensed information to the CPU 5. The angular velocity sensor 6 is an example of the "turning sensor" of the present invention.

In this first embodiment, the CPU 5 performs control to indirectly acquire the second turning angular velocity $\omega_4$ of the walking assistance moving vehicle main body 1 based on the drive wheel rotational speeds $\omega_1$ and $\omega_2$ sensed by the Hall sensor 41. In the illustrated embodiment, the phrase "indirectly acquiring a parameter" basically means calculating the parameter based on sensed information that is directly sensed by a sensor and is not equivalent to the parameter.

More specifically, as shown in FIG. 3, in a state in which the drive wheels 23 and 24 are both on the ground, the second turning angular velocity $\omega_4$ is calculated from the following Formulas (1) to (3) using the drive wheel rotational speeds $\omega_1$ and $\omega_2$ and the turning radius Rt. Here, L represents the spacing between the drive wheels 23 and 24, and r represents radius of the drive wheels 23 and 24 (see FIG. 1).

Formulas (1) to (3):

$$V_t = (r\omega_1 + r\omega_2)/2 \; [\text{m/s}] \qquad (1)$$

$$R_t = (\omega_1 + \omega_2)/(\omega_1 - \omega_2) \times L/2 \; [\text{m}] \qquad (2)$$

$$\omega_4 = V_t/R_t = (r\omega_1 - r\omega_2)/L \; [\text{rad/s}] \qquad (3)$$

Also, in the first embodiment, the CPU 5 calculates the difference between the first turning angular velocity $\omega_3$ and the second turning angular velocity $\omega_4$. The CPU 5 also performs control to calculate a value C1 for comparing with the following Formula (4).

Formula (4):

$$C1 = |(\omega_3 - \omega_4)/\omega_4| \qquad (4)$$

In the first embodiment, if the value C1 used for comparison is 0.2 or higher, then control is performed to stop the drive of the drive wheels 23 and 24 without relying on the information from the pressure sensors 31. More specifically, if the value C1 used for comparison is 0.2 or higher, then the CPU 5 performs control to output information to the motor driver 4 to set the current value to zero even if the user pushes or pulls the grip component 32 and pressure information from the pressure sensors 31 is inputted. In the illustrated embodiment, the phrase "performing a control without relying on the information from the pressure sensors 31" also means performing a control regardless of the information from the pressure sensors 31.

The operation during turning of the walking assistance moving vehicle 100 will now be described through reference to FIG. 5.

As shown in FIG. 5, the user U pushes the walking assistance moving vehicle 100 forward from the rear at a pressure P1 on the left side and a pressure P2 on the right side. If the pressure P2 is higher than the pressure P1, then the CPU 5 controls the motor driver 4 so that the torque value T2 of the drive wheel 24 is higher than the torque value T1 of the drive wheel 23. At this point, it is the intention of the user U to turn the walking assistance moving vehicle 100 to the left-front side. As shown in FIG. 5, when the drive wheels 23 and 24 are touching the ground, the walking assistance moving vehicle 100 turns to the left-front side, which is the direction intended by the user U.

In this case, the values of the first turning angular velocity $\omega_3$ and the second turning angular velocity $\omega_4$ are substantially equal, and the value C1 used for comparison is less than 0.2. Consequently, the CPU 5 drives the drive wheels 23 and 24 based on information from the pressure sensors 31 even though the walking assistance moving vehicle 100 is in the midst of turning, and thereby continuing the turning operation of the walking assistance moving vehicle 100.

The operation of the walking assistance moving vehicle 100 during freewheeling of the drive wheel 23 or 24 will now be described through reference to FIGS. 6 and 7.

Figure 6:
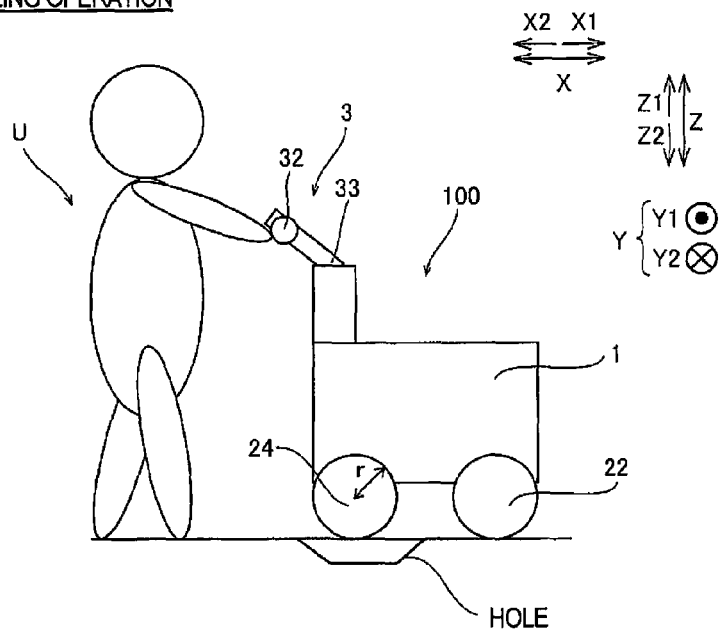
FIG. 6 is a schematic diagram illustrating a freewheeling operation of the walking assistance moving vehicle in accordance with the first embodiment.
Figure 7:
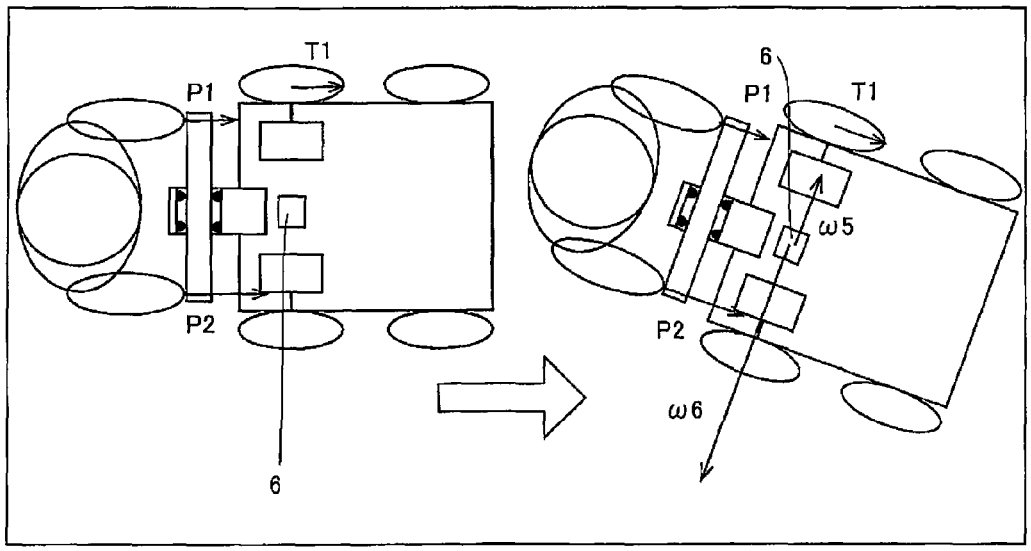
FIG. 7 is a schematic diagram illustrating the freewheeling operation of the walking assistance moving vehicle in accordance with the first embodiment.

As shown in FIG. 6, the user U pushes the walking assistance moving vehicle 100 forward from the rear at the pressure P1 and the pressure P2. If the pressure P2 is higher than the pressure P1, then the CPU 5 controls the motor driver 4 so that the torque value T2 of the drive wheel 24 is higher than the torque value T1 of the drive wheel 23. The user U here wants to turn the walking assistance moving vehicle 100 to the left-front side. In this case, if freewheeling is detected based on only the drive wheel rotational speed as in the conventional vehicle, and if the drive wheel 24 is not touching the ground, such as if there is a hole in the ground as shown in FIG. 6, then the torque value of the drive wheel 23 will be T1, while the torque value of the drive wheel 24 will be zero, as shown in FIG. 7. As a result, the walking assistance moving vehicle 100 turns to the right-front side, which is not the direction intended by the user. In the illustrated embodiment, the term "freewheeling" of a drive wheel means that the drive wheel spins or rotates without transmitting torque to the ground or with transmitting less torque to the ground.

Meanwhile, in the first embodiment, the value C1 used for comparison calculated using Formula (4) based on the values of a first turning angular velocity ω5 (ω3) and a second turning angular velocity ω6 (ω4) is 0.2 or higher in this case. Consequently, the CPU 5 stops the drive of the walking assistance moving vehicle 100 by stopping the drive of the drive wheels 23 and 24 without relying on information from the pressure sensors 31. As a result, unlike in FIG. 7, the drive of the walking assistance moving vehicle 100 stops, without continuing the turning to the right-front side that is not the direction intended by the user U.

Figure 8:
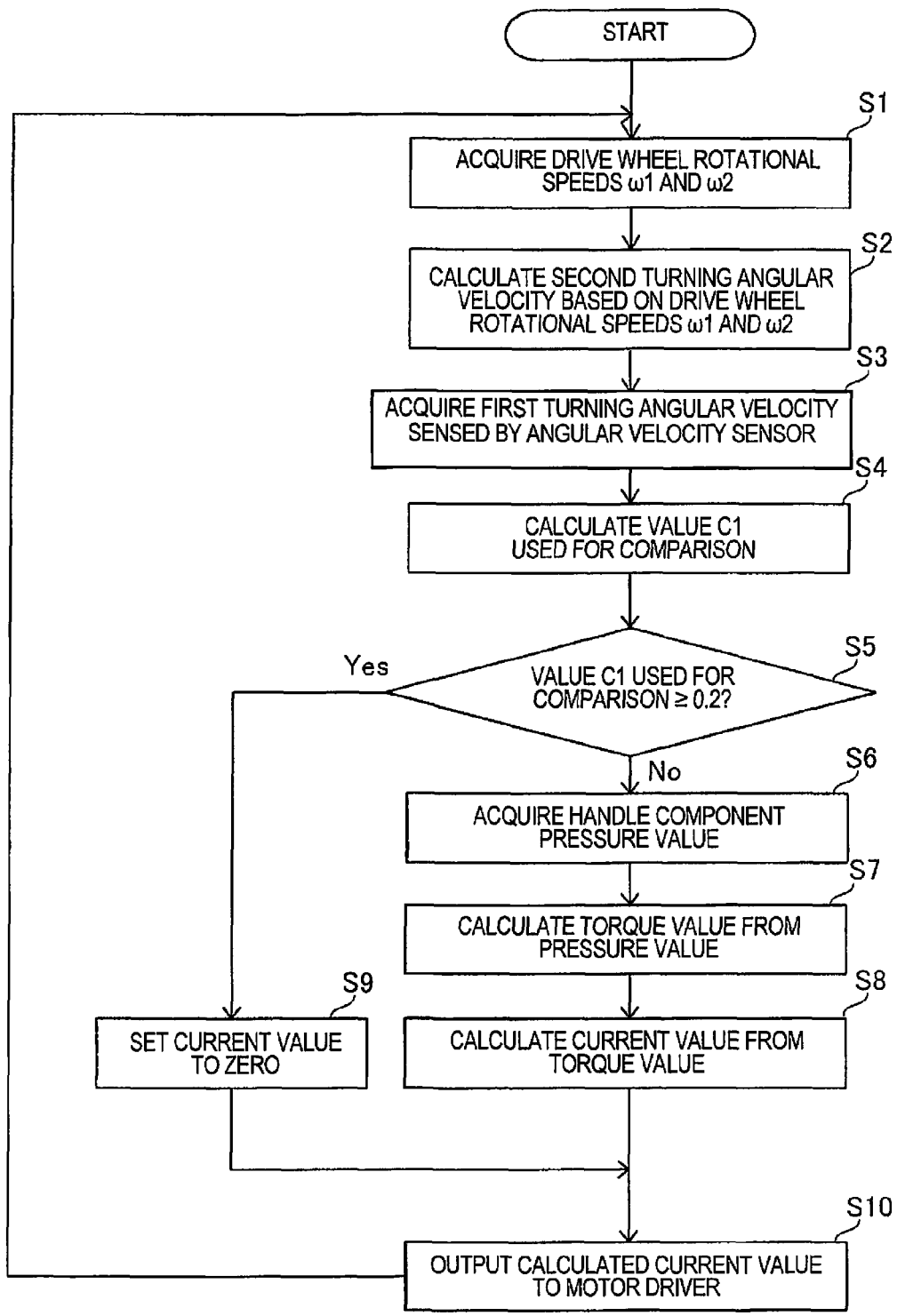
FIG. 8 is a flowchart illustrating drive wheel freewheeling sensing processing for the walking assistance moving vehicle in accordance with the first embodiment.

Next, the flow of sensing the freewheeling of the drive wheels 23 and 24 of the walking assistance moving vehicle 100 in the first embodiment will be described through reference to FIG. 8. The processing in the walking assistance moving vehicle 100 is performed by the CPU 5.

First, in step S1, the drive wheel rotational speeds ω1 and ω2 sensed by the Hall sensors 41 and 42 are acquired. Then, in step S2, the second turning angular velocity ω4 is calculated based on the acquired drive wheel rotational speeds ω1 and ω2.

Next, in step S3, the first turning angular velocity ω3 sensed by the angular velocity sensor 6 is acquired. In step S4 the value C1 used for comparison is calculated. The flow then proceeds to step S5.

In the first embodiment, in step S5 it is determined whether or not the value based on the absolute difference between the first turning angular velocity ω3 and the second turning angular velocity ω4 is equal to or greater than a specific turning angular velocity difference. Specifically, if the value C1 used for comparison is 0.2 or higher, then the flow proceeds to step S9. On the other hand, if the value C2 used for comparison is less than 0.2, then the flow proceeds to step S6.

Then, in step S6, information is acquired about the pressure values sensed by the pressure sensors 31 provided to the handle component 3. In step S7, the torque values of the drive wheels 23 and 24 are calculated based on the acquired pressure information. The flow then proceeds to step S8.

In step S8, the current to be sent to the motors 43 and 44 is calculated based on the calculated torque values. The flow then proceeds to step S10.

In the first embodiment, if the value C1 used for comparison is 0.2 or higher in step S5, then the current to be sent to the motors 43 and 44 is set to zero in step S9. The flow then proceeds to step S10.

In step S10, the current value calculated in step S8 or step S9 is outputted to the motor driver 4. After this, the flow returns to step S1 and the drive wheel freewheeling sensing flow is repeated.

The following effect can be obtained with the first embodiment.

In the first embodiment, as discussed above, the walking assistance moving vehicle 100 includes the walking assistance moving vehicle main body 1, the casters 21, 22, the drive wheels 23 and 24, the Hall sensors 41 and 42, the angular velocity sensor 6, and the CPU 5. The walking assistance moving vehicle main body 1 assists the walking of the user. The casters 21 and 22 are provided the walking assistance moving vehicle main body 1. The Hall sensors 41 and 42 sense the drive wheel rotational speeds ω1 and ω2 of the drive wheels 23 and 24, respectively. The angular velocity sensor 6 directly senses at least the first turning angular velocity ω3 during turning of the walking assistance moving vehicle main body 1. The CPU 5 performs the first control to indirectly acquire at least the second lateral acceleration ω4 of the walking assistance moving vehicle main body 1 based on the drive wheel rotational speeds ω1 and ω2 sensed by the Hall sensors 41 and 42, and to decelerate or stop the drive of the drive wheels 23 and 24 based on the comparison of the first turning angular velocity ω3 and the second turning angular velocity ω4. Consequently, at least the first turning angular velocity ω3 during turning of the walking assistance moving vehicle main body 1 is directly sensed by the angular velocity sensor 6. Thus, a state in which one of the drive wheels 23 and 24 is freewheeling can be distinguished from a state in which the walking assistance moving vehicle main body 1 is turning. When one of the drive wheels 23 and 24 is freewheeling, control is performed to decelerate or stop the drive of the drive wheels 23 and 24. Thus, it is less likely that the walking assistance moving vehicle main body will turn in a direction not intended by the user U. As a result, turning in a direction not intended by the user U can be made less likely to occur by accurately sensing freewheeling of the drive wheel 23 or 24.

In the first embodiment, as discussed above, the walking assistance moving vehicle 100 further includes the pressure sensors 31 that sense the degree of adjustment input of assist force by the user U. The CPU 5 performs the first control to drive the drive wheels 23 and 24 based on information from the pressure sensors 31, without relying on the information from the pressure sensors 31 if the value based on the absolute difference between the first turning angular velocity ω3 and the second turning angular velocity ω4 is equal to or greater than the specific turning angular velocity difference threshold (if the value C1 used for comparison is 0.2 or higher). Consequently, if the value based on the absolute difference between the first turning angular velocity ω3 and the second turning angular velocity ω4 is equal to or greater than the specific turning angular velocity difference threshold (if the value C1 used for comparison is 0.2 or higher), then it can be concluded that one of the drive wheels 23 and 24, among the drive wheels 23 and 24, is freewheeling. If the drive wheel 23 or 24 is freewheeling, then the drive of the drive wheels 23 and 24 is decelerated or stopped without relying on information from the pressure sensors 31. Thus, it is less likely that the walking assistance moving vehicle main body 1 will turn in a direction not intended by the user U.

In the first embodiment, as discussed above, the CPU 5 performs control to stop the drive of the drive wheels 23 and 24 if the value based on the absolute difference between the first turning angular velocity ω3 and the second turning angular velocity ω4 is equal to or greater than the specific turning angular velocity difference threshold (if the value C1 used for comparison is 0.2 or higher). Consequently, if it is concluded that either of the drive wheels 23 and 24, among the drive wheels 23 and 24, is freewheeling, then the drive of the drive wheels 23 and 24 is stopped. Thus, it is much less likely that the walking assistance moving vehicle main body 1 will turn in a direction not intended by the user U.

In the first embodiment, as discussed above, the plurality of the pressure sensors 31 are included that sense the strength or the drive force with which the user U pushes or pulls the walking assistance moving vehicle main body 1 and the direction of the strength or the drive force when the handle component 3 is gripped by the user U. The CPU 5 performs control to drive the drive wheels 23 and 24 in the drive direction in which the user U pushes or pulls the walking assistance moving vehicle main body 1 based on the information from the pressure sensors 31. The CPU 5 also performs the first control if the value based on the absolute difference between the first turning angular velocity ω3 and the second turning angular velocity ω4 is equal to or greater than the specific turning angular velocity difference threshold (if the value C1 used for comparison is 0.2 or higher), without relying on the information from the pressure sensors 31. Consequently, the drive force and the drive direction can be sensed by comparing the sensing values of the pressure sensors 31.

Second Embodiment

Referring now to FIGS. 9 to 15, a walking assistance moving vehicle 101 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In the first embodiment, the walking assistance moving vehicle 100 has the angular velocity sensor 6 as a turning sensor of the present invention. On the other hand, in this second embodiment, the walking assistance moving vehicle 101 has an acceleration sensor 6a as a turning sensor of the present invention. Basically, the walking assistance moving vehicle 101 in the second embodiment can be identical to the walking assistance moving vehicle 100 in the first embodiment, except for the configurations described below.

Figure 9:
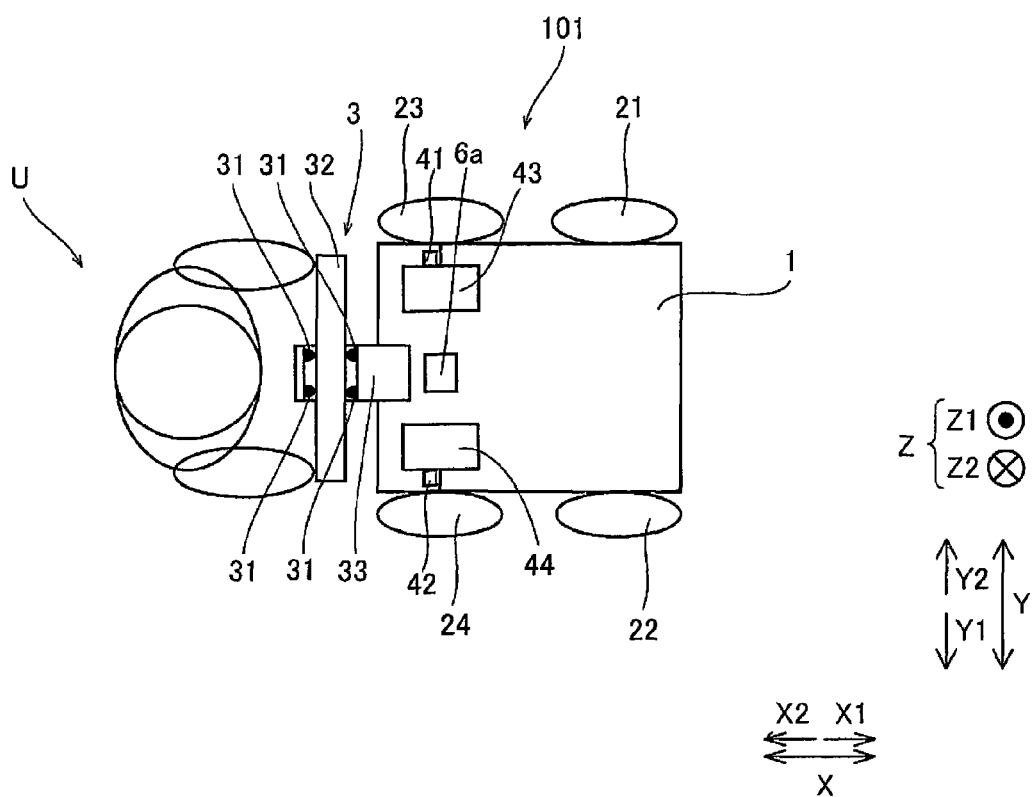
FIG. 9 is a top plan view of a walking assistance moving vehicle in accordance with a second embodiment.

As shown in FIG. 9, in the second embodiment, the acceleration sensor 6a is disposed inside the walking assistance moving vehicle main body 1. The acceleration sensor 6a directly senses a first lateral acceleration A1 of the walking assistance moving vehicle main body 1. The acceleration sensor 6a directly senses the first lateral acceleration A1, which is the acceleration in the left and right direction, and inputs the sensed information to a CPU 5a. The acceleration sensor 6a is an example of the "turning sensor" of the present invention.

Figure 10:
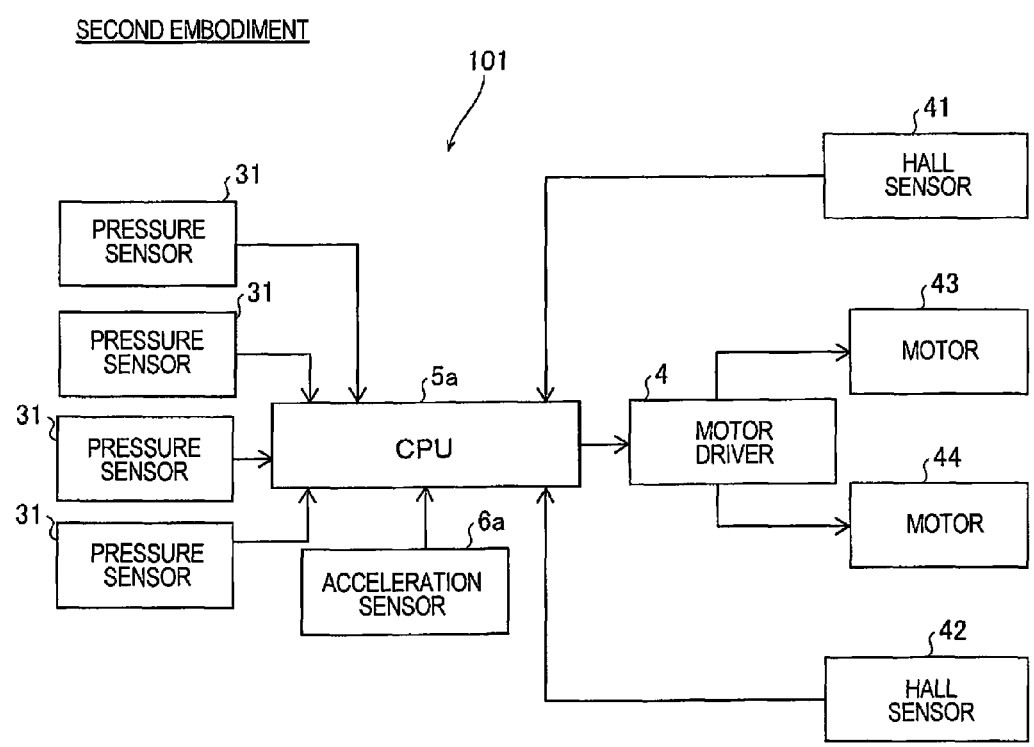
FIG. 10 is a block diagram of the configuration of the walking assistance moving vehicle in accordance with the second embodiment.
Figure 11:
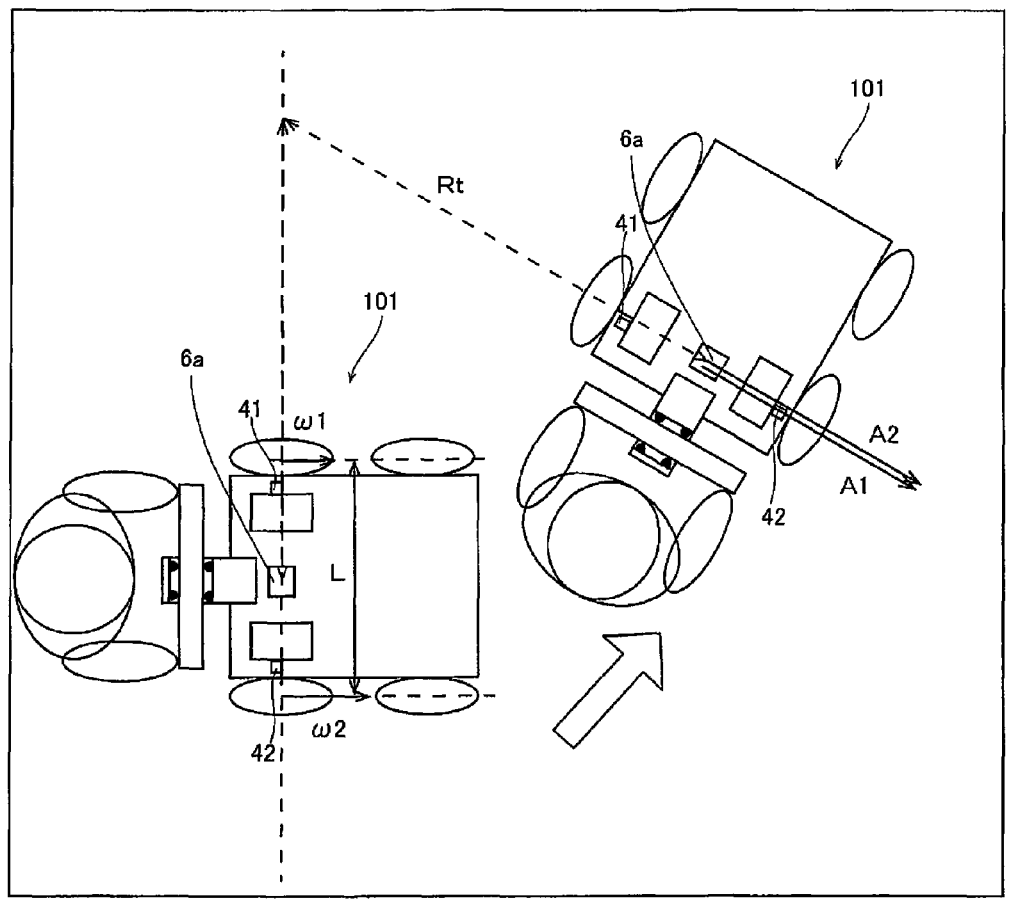
FIG. 11 is a schematic diagram illustrating how a lateral acceleration of the walking assistance moving vehicle in accordance with the second embodiment is acquired.

As shown in FIGS. 9 and 10, in the second embodiment, the CPU 5a performs control to indirectly acquire a second lateral acceleration A2 of the walking assistance moving vehicle main body 1 based on the drive wheel rotational speeds ω1 and ω2 sensed by the Hall sensors 41 and 42. More specifically, as shown in FIG. 11, in a state in which the drive wheels 23 and 24 are both on the ground, the second lateral acceleration A2 is calculated from the following Formulas (5) to (8) using the drive wheel rotational speeds ω1 and ω2 and the turning radius Rt. Here, L represents the spacing between the drive wheels 23 and 24, and r represents the radius of the drive wheels 23 and 24.

Formulas (5) to (8):

$$V_t = (r\omega_1 + r\omega_2)/2 \text{ [m/s]} \quad (5)$$

$$R_t = (\omega_1 + \omega_2)/(\omega_1 - \omega_2) \times L/2 \text{ [m]} \quad (6)$$

$$\omega_t = V_t/R_t = (r\omega_1 - \omega_2)/L \text{ [rad/s]} \quad (7)$$

$$A2 = R_t \cdot \omega_t^2 \text{ [m/s}^2\text{]} \quad (8)$$

In the second embodiment, the CPU 5a calculates the difference between the first lateral acceleration A1 and the second lateral acceleration A2. The CPU 5a also performs control to calculate a value C2 used for comparison with the following Formula (9).

Formula (9):

$$C2 = |(A1 - A2)/A2| \quad (9)$$

In the second embodiment, the CPU 5a performs control to stop the drive of the drive wheels 23 and 24 if the value C2 used for comparison is 0.2 or higher, without relying on information from the pressure sensors 31. More specifically, if the value C2 used for comparison is 0.2 or higher, then the CPU 5a performs control to output information so as to set the current sent to the motor driver 4 to zero even though the user has pushed or pulled the grip component 32 and information about pressure from the pressure sensors 31 has been inputted.

The rest of the configuration of the walking assistance moving vehicle 101 in accordance with the second embodiment is the same as that of the walking assistance moving vehicle 100 in the first embodiment.

The operation of the walking assistance moving vehicle 101 during turning will now be described through reference to FIG. 12.

Figure 12:
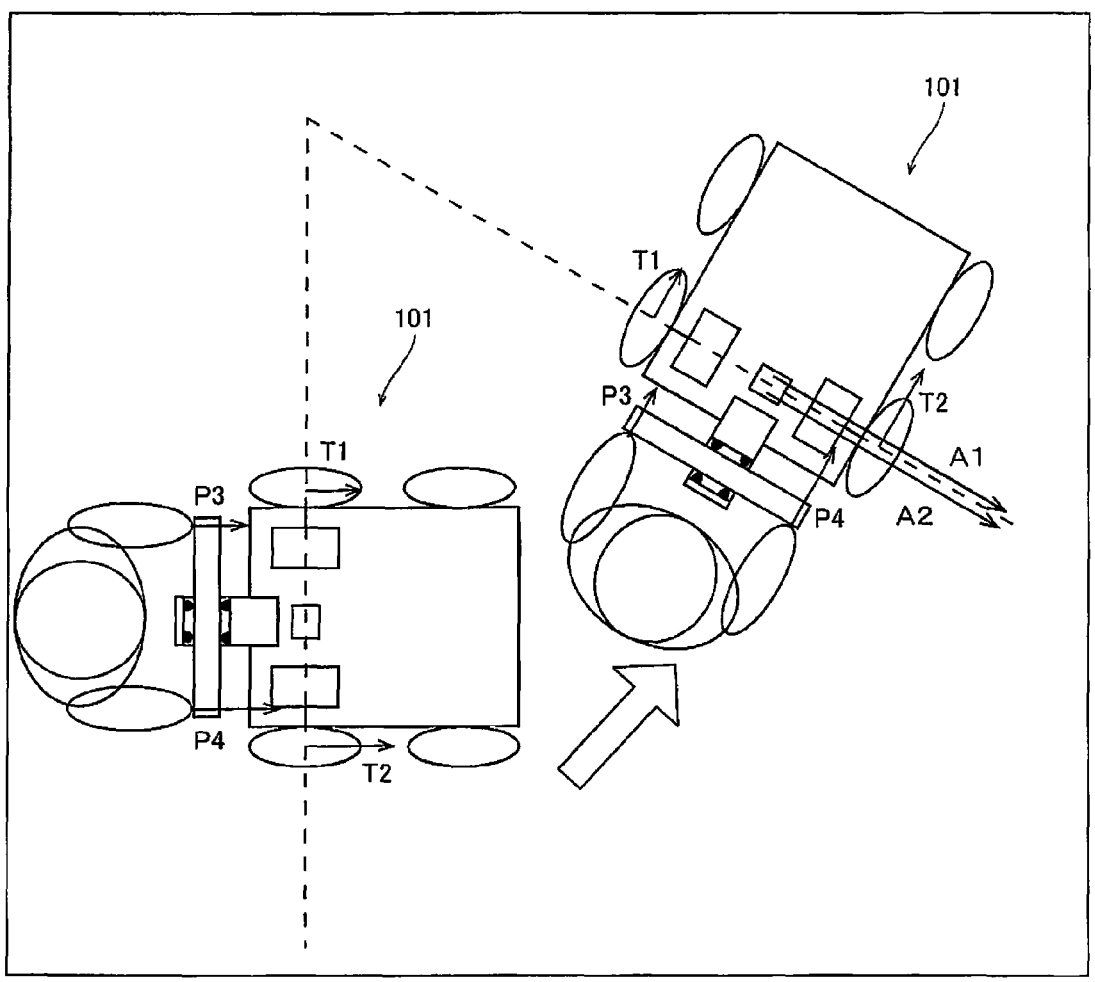
FIG. 12 is a schematic diagram illustrating a turning operation of the walking assistance moving vehicle in accordance with the second embodiment.

As shown in FIG. 12, when the user U pushes the walking assistance moving vehicle 101 forward from the rear at a pressure P3 on the left side and a pressure P4 on the right side. If the pressure P4 is higher than the pressure P3, then the CPU 5a controls the motor driver 4 so that the torque value T2 of the drive wheel 24 is higher than the torque value T1 of the drive wheel 23. The user U here wants to turn the walking assistance moving vehicle 101 to the left-front side. If the drive wheels 23 and 24 are touching the ground, the walking assistance moving vehicle 101 turns to the left-front side, which is the direction intended by the user U.

In this case, the values of the first lateral acceleration A1 and the second lateral acceleration A2 are substantially equal, and the value C2 used for comparison is less than 0.2. Consequently, the CPU 5a drives of the drive wheels 23 and 24 based on information from the pressure sensors 31 even though the walking assistance moving vehicle 101 is in the midst of turning, and thereby continuing the turning operation of the walking assistance moving vehicle 101.

Figure 13:
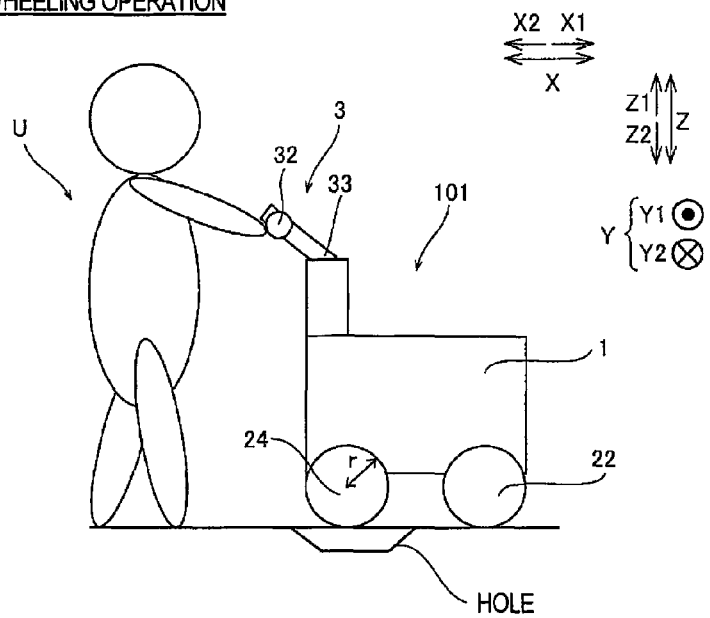
FIG. 13 is a schematic diagram illustrating a freewheeling operation of the walking assistance moving vehicle in accordance with the second embodiment.

The operation of the walking assistance moving vehicle 101 during freewheeling of the drive wheel 23 or 24 will now be described through reference to FIGS. 13 and 14.

Figure 14:
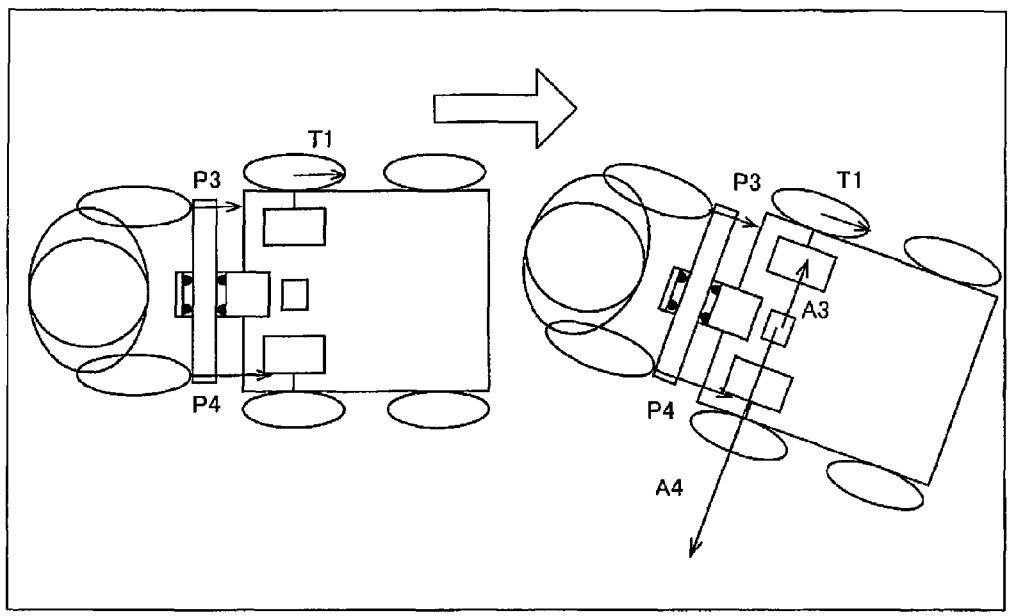
FIG. 14 is a schematic diagram illustrating the freewheeling operation of the walking assistance moving vehicle in accordance with the second embodiment.

As shown in FIG. 14, the user U pushes the walking assistance moving vehicle 101 forward from the rear at the pressure P3 and the pressure P4. If the pressure P4 is higher than the pressure P3, then the CPU 5a controls the motor driver 4 so that the torque value T2 of the drive wheel 24 is higher than the torque value T1 of the drive wheel 23. At this point, it is the intention of the user U to turn the walking assistance moving vehicle 101 to the left-front side. In this case, if freewheeling is detected based on only the drive wheel rotational speed as in the conventional vehicle, and if the drive wheel 24 is not touching the ground, such as if there is a hole in the ground as shown in FIG. 13, then the torque value of the drive wheel 23 will be T1, while the torque value of the drive wheel 24 will be zero, as shown in FIG. 14. As a result, the walking assistance moving vehicle 101 turns to the right-front side, which is not the direction intended by the user.

Meanwhile, in the second embodiment, the value C2 used for comparison calculated using Formula (9) based on the values of a first lateral acceleration A3 (A1) and a second lateral acceleration A4 (A2) is 0.2 or higher in this case. Consequently, the CPU 5a stops the drive the drive wheels 23 and 24 without relying on the information from the pressure sensors 31, and thereby stopping the drive of the walking assistance moving vehicle 101. As a result, unlike in FIG. 14, the drive of the walking assistance moving vehicle 101 stops, without continuing the turning to the right-front side, which is a direction not intended by the user U.

Figure 15:
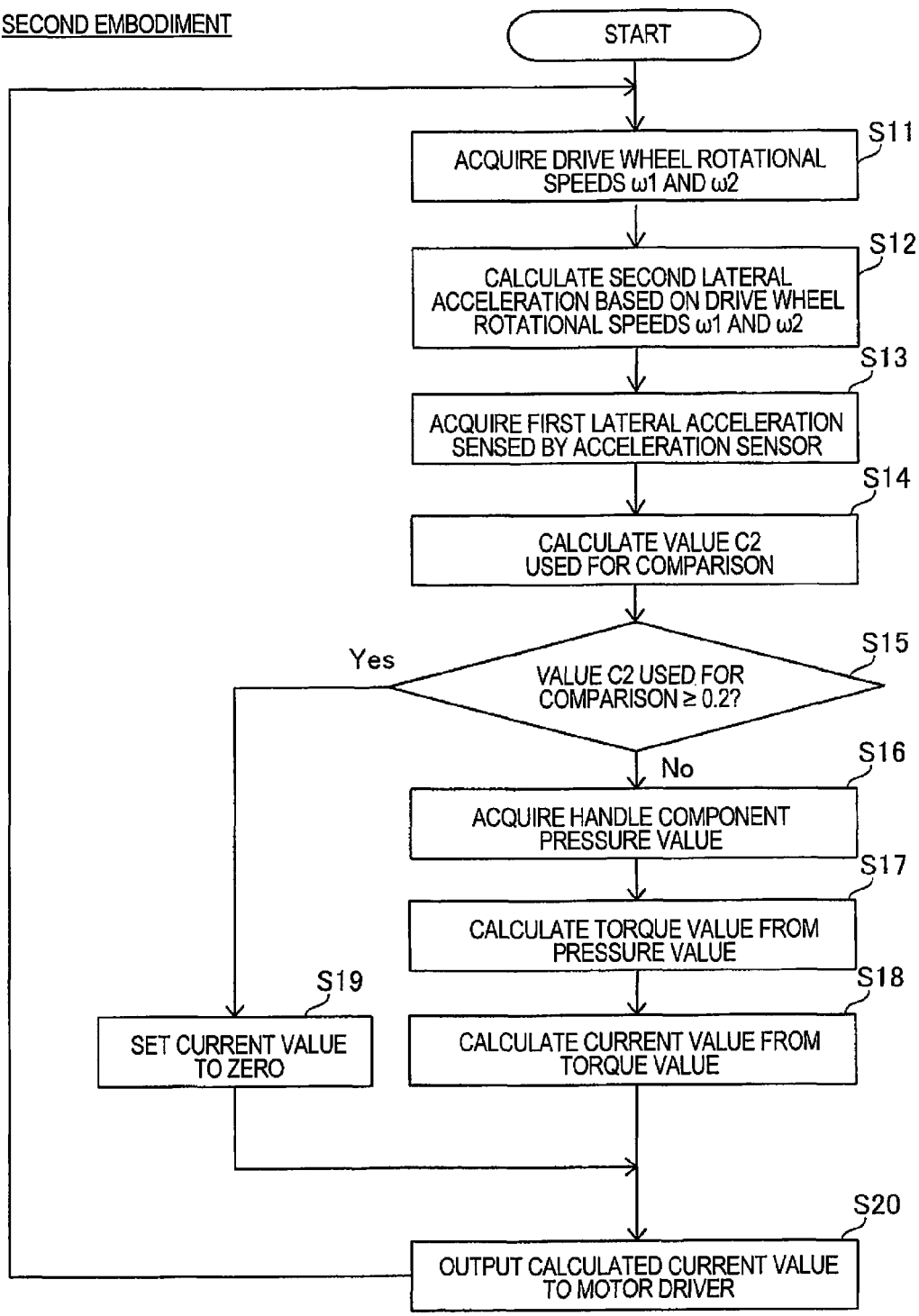
FIG. 15 is a flowchart illustrating drive wheel freewheeling sensing processing for the walking assistance moving vehicle in accordance with the second embodiment.

Next, the flow of sensing the freewheeling of the drive wheels 23 and 24 of the walking assistance moving vehicle 101 in the second embodiment will be described through reference to FIG. 15. The processing in the walking assistance moving vehicle 101 is performed by the CPU 5a.

First, in step S11, the drive wheel rotational speeds ω1 and ω2 sensed by the Hall sensors 41 and 42 are acquired. Then, in step S12, the second lateral acceleration A2 is calculated based on the acquired drive wheel rotational speeds ω1 and ω2.

Next, in step S13, the first lateral acceleration A1 sensed by the acceleration sensor 6a is acquired. In step S14 the value C2 used for comparison is calculated. The flow then proceeds to step S15.

In the second embodiment, in step S15 it is determined whether or not the value based on the absolute difference between the first lateral acceleration A1 and the second lateral acceleration A2 is equal to or greater than a specific lateral acceleration difference. Specifically, if the value C2 used for comparison is 0.2 or higher, then the flow proceeds to step S19. On the other hand, if the value C2 used for comparison is less than 0.2, then the flow proceeds to step S16.

Then, in step S16, information is acquired about the pressure values sensed by the pressure sensors 31 provided to the handle component 3. In step S17, the torque values of the drive wheels 23 and 24 are calculated based on the acquired pressure information. The flow then proceeds to step S18.

In step S18 the current to be sent to the motors 43 and 44 is calculated based on the calculated torque values. The flow then proceeds to step S20.

In the second embodiment, if the value C2 used for comparison is 0.2 or higher in step S15, then the current to be sent to the motors 43 and 44 is set to zero in step S19. The flow then proceeds to step S20.

In step S20, the current value calculated in step S18 or step S19 is outputted to the motor driver 4. After this, the flow returns to step S11 and the drive wheel freewheeling sensing flow is repeated.

The following effect can be obtained with the second embodiment.

In the second embodiment, as discussed above, the the walking assistance moving vehicle 101 includes the walking assistance moving vehicle main body 1, the casters 21, 22, the drive wheels 23 and 24, the Hall sensors 41 and 42, the acceleration sensor 6a, and the CPU 5a. The walking assistance moving vehicle main body 1 assists the walking of the user. The casters 21 and 22 are provided to the walking assistance moving vehicle main body 1. The Hall sensors 41 and 42 sense the drive wheel rotational speeds ω1 and ω2 of the drive wheels 23 and 24, respectively. The acceleration sensor 6a directly senses at least the first lateral acceleration A1 during turning of the walking assistance moving vehicle main body 1. The CPU 5a performs the first control to indirectly acquire at least the second lateral acceleration A2 of the walking assistance moving vehicle main body 1 based on the drive wheel rotational speeds ω1 and ω2 sensed by the Hall sensors 41 and 42, and to decelerate or stop the drive of the drive wheels 23 and 24 based on the comparison of the first lateral acceleration A1 and the second lateral acceleration A2. Consequently, at least the first lateral acceleration A1 during turning of the walking assistance moving vehicle main body 1 is directly sensed by the acceleration sensor 6a. Thus, a state in which one of the drive wheels 23 and 24 is freewheeling can be distinguished from a state in which the walking assistance moving vehicle main body 1 is turning. When one of the drive wheels 23 and 24 is freewheeling, control is performed to decelerate or stop the drive of the drive wheels 23 and 24. Thus, it is less likely that the walking assistance moving vehicle main body will turn in a direction not intended by the user U. As a result, turning in a direction not intended by the user U can be made less likely to occur by accurately sensing freewheeling of the drive wheel 23 or 24.

In the second embodiment, as discussed above, the walking assistance moving vehicle 101 further includes the pressure sensors 31 that sense the degree of adjustment input of assist force by the user U. The CPU 5a performs the first control to drive the drive wheels 23 and 24 based on information from the pressure sensors 31, without relying on the information from the pressure sensors 31 if the value based on the absolute difference between the first lateral acceleration A1 and the second lateral acceleration A2 is equal to or greater than the specific lateral acceleration difference threshold (if the value C2 used for comparison is 0.2 or higher). Consequently, if the value based on the absolute difference between the first lateral acceleration A1 and the second lateral acceleration A2 is equal to or greater than the specific lateral acceleration difference threshold (if the value C2 used for comparison is 0.2 or higher), then it can be concluded that one of the drive wheels 23 and 24, among the drive wheels 23 and 24, is freewheeling. If the drive wheel 23 or 24 is freewheeling, then the drive of the drive wheels 23 and 24 is decelerated or stopped without relying on information from the pressure sensors 31. Thus, it is even less likely that the walking assistance moving vehicle main body 1 will turn in a direction not intended by the user U.

In the second embodiment, as discussed above, the CPU 5a performs control to stop the drive of the drive wheels 23 and 24 if the value based on the absolute difference between the first lateral acceleration A1 and the second lateral acceleration A2 is equal to or greater than the specific lateral acceleration difference threshold (if the value C2 used for comparison is 0.2 or higher). Consequently, if it is concluded that either of the drive wheels 23 and 24, among the drive wheels 23 and 24, is freewheeling, then the drive of the drive wheels 23 and 24 is stopped. Thus, it is much less likely that the walking assistance moving vehicle main body 1 will turn in a direction not intended by the user U.

In the second embodiment, as discussed above, the plurality of the pressure sensors 31 are included that sense the strength or the drive force with which the user U pushes or pulls the walking assistance moving vehicle main body 1 and the direction of the strength or the drive force when the handle component 3 is gripped by the user U. The CPU 5a performs control to drive the drive wheels 23 and 24 in the drive direction in which the user U pushes or pulls the walking assistance moving vehicle main body 1 based on the information from the pressure sensors 31. The CPU 5 also performs the first control if the value based on the absolute difference between the first lateral acceleration A1 and the second lateral acceleration A2 is equal to or greater than the specific lateral acceleration difference threshold (if the value C2 used for comparison is 0.2 or higher), without relying on the information from the pressure sensors 31. Consequently, the drive force and the drive direction can be sensed by comparing the sensing values of the pressure sensors 31.

The rest of the effect of the walking assistance moving vehicle 101 in accordance with the second embodiment is the same as that of the walking assistance moving vehicle 100 in the first embodiment.

Third Embodiment

Referring now to FIGS. 16 to 20, a walking assistance moving vehicle 102 in accordance with a third embodiment will now be explained. In view of the similarity between the first to third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity. In the first embodiment, the walking assistance moving vehicle 100 is configured so that a state in which either one of the drive wheels 23 and 24, among the drive wheels 23 and 24, is freewheeling is sensed. On the other hand, in this third embodiment, a state in which both of the drive wheels 23 and 24, among the drive wheels 23 and 24, are freewheeling is further sensed. Basically, the walking assistance moving vehicle 102 in the third embodiment can be identical to the walking assistance moving vehicle 100 in the first embodiment, except for the configurations described below.

Figure 16:
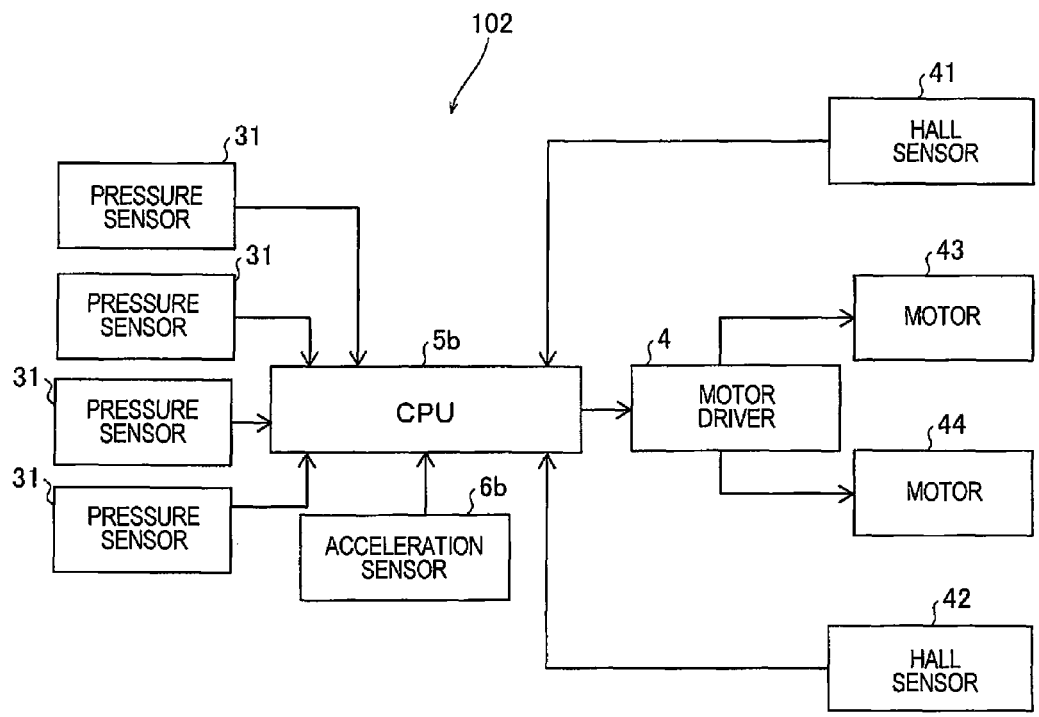
FIG. 16 is a block diagram of the configuration of a walking assistance moving vehicle in accordance with a third embodiment.

As shown in FIG. 16, with this third embodiment, an acceleration sensor 6b is disposed inside the walking assistance moving vehicle main body 1. The acceleration sensor 6b directly senses a first longitudinal acceleration A5 during drive of the walking assistance moving vehicle main body 1. The acceleration sensor 6b directly senses the first longitudinal acceleration A5, which is acceleration in the longitudinal direction, and inputs the sensed information to a CPU 5b.

Figure 17:
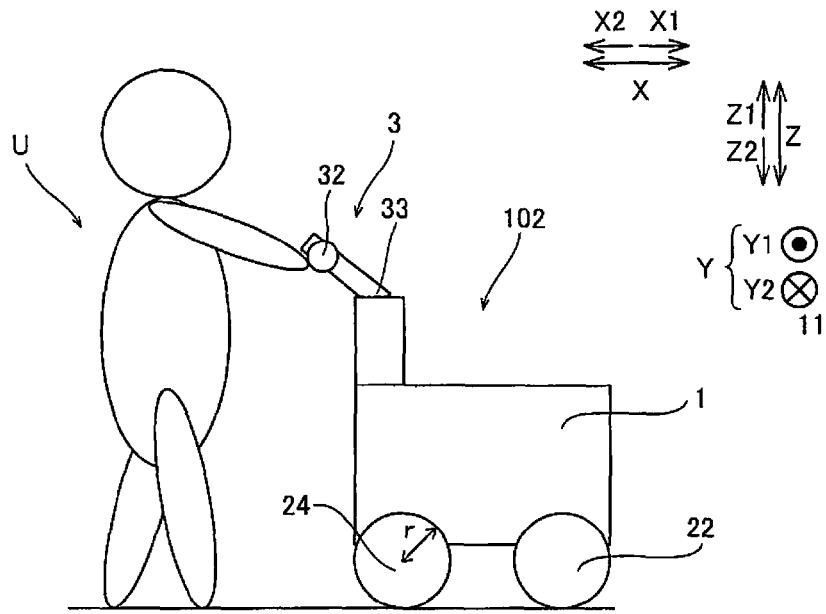
FIG. 17 is a schematic diagram illustrating a forward movement of the walking assistance moving vehicle in accordance with the third embodiment.
Figure 18:
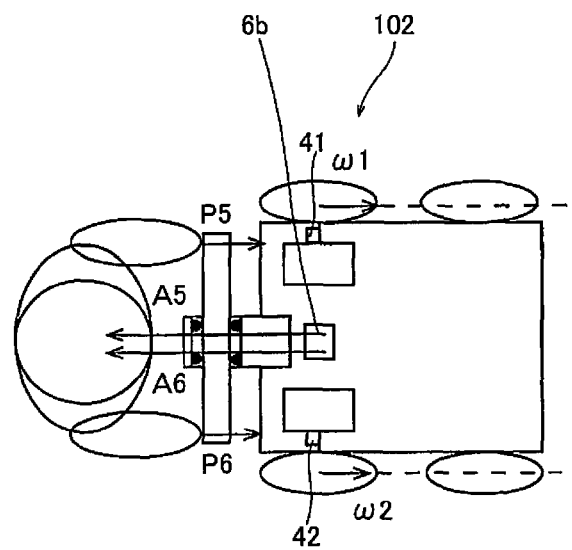
FIG. 18 is a schematic diagram illustrating the forward movement of the walking assistance moving vehicle in accordance with the third embodiment.

As shown in FIG. 16, in the third embodiment, the CPU 5b performs control to indirectly acquire a second longitudinal acceleration A6 of the walking assistance moving vehicle main body 1 based on the drive wheel rotational speeds ω1 and ω2 sensed by the Hall sensors 41 and 42. More specifically, as shown in FIGS. 17 and 18, in a state in which the drive wheels 23 and 24 are both on the ground, the second longitudinal acceleration A6 is calculated from the following Formula (10) by using the radius r of the drive wheels 23 and 24 and the drive wheel rotational speeds ω1 and ω2.

Formula (10)

$$A6 = \frac{d}{dt}(\omega_1 + \omega_2)r/2 [m/s^2] \quad (10)$$

In the third embodiment, the CPU 5b calculates the difference between the first longitudinal acceleration A5 and the second longitudinal acceleration A6. The CPU 5b also performs control to calculate a value C3 used for comparison with the following Formula (11).

Formula (11):

$$C3 = |(A5-A6)/A6| \quad (11)$$

In the third embodiment, the CPU 5b performs control to stop the drive of the drive wheels 23 and 24 if the value C3 used for comparison is 0.2 or higher, without relying on information from the pressure sensors 31. More specifically, if the value C3 used for comparison is 0.2 or higher, then the CPU 5b performs control to output information to set the current sent to the motor driver 4 to zero, even though the user has pushed or pulled the grip component 32 and pressure information has been inputted from the pressure sensors 31.

The rest of the configuration of the walking assistance moving vehicle 102 in accordance with the third embodiment is the same as that of the walking assistance moving vehicle 100 in the first embodiment.

Figure 19:
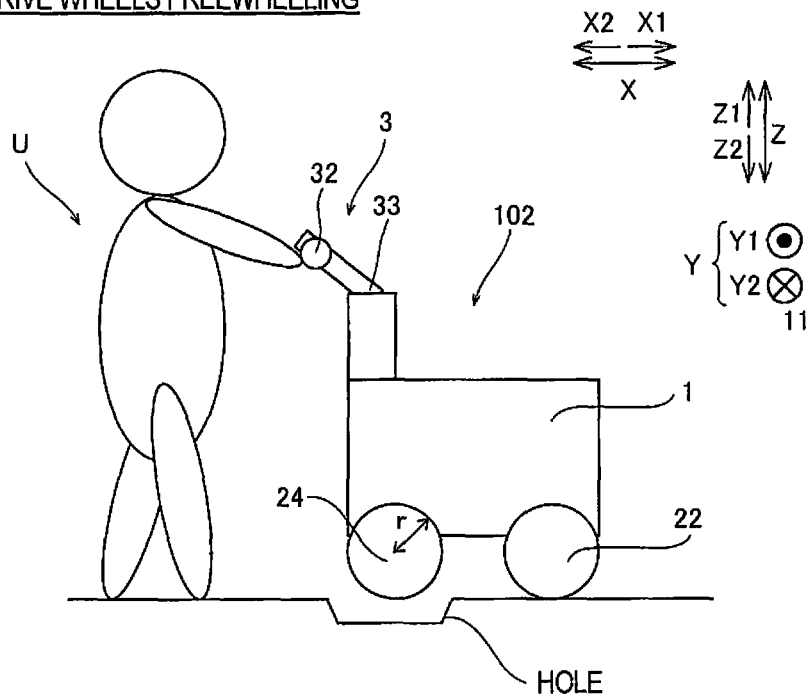
FIG. 19 is a schematic diagram illustrating a freewheeling operation of the walking assistance moving vehicle in accordance with the third embodiment.

The operation of the walking assistance moving vehicle 102 during freewheeling of the drive wheels 23 and 24 will now be described through reference to FIGS. 19 and 20.

Figure 20:
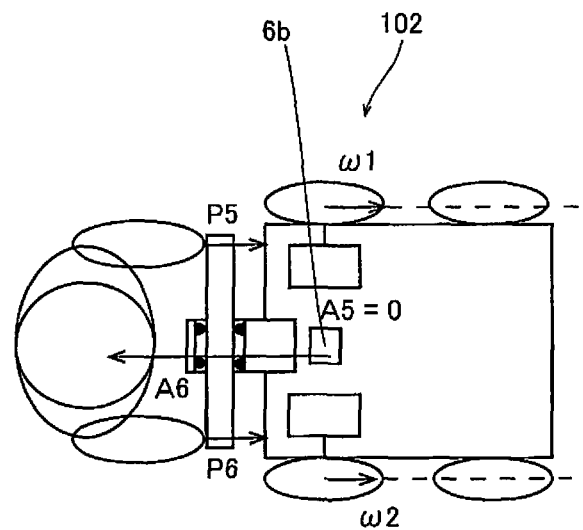
FIG. 20 is a schematic diagram illustrating the freewheeling operation of the walking assistance moving vehicle in accordance with the third embodiment.

As shown in FIG. 20, the user U pushes the walking assistance moving vehicle 102 forward from the rear at a pressure P5 on the left side and a pressure P6 on the right side. If the pressure P5 is the same as the pressure P6, then the CPU 5b controls the motor driver 4 so that the drive wheels 23 and 24 have the same torque value T1. If the drive wheels 23 and 24 here are not touching the ground, then the walking assistance moving vehicle 102 will not move, and the drive wheels 23 and 24 will freewheel, as shown in FIG. 20.

If this happens, then the value C3 used for comparison calculated using Formula (11) based on the values of the first longitudinal acceleration A5 and the second longitudinal acceleration A6 is 0.2 or higher. Consequently, the CPU 5b stops the drive of the drive wheels 23 and 24, and thereby stopping the drive of the walking assistance moving vehicle 102, without relying on information from the pressure sensors 31. As a result, if the drive wheels 23 and 24 freewheel, such as in a state in which the rear of the walking assistance moving vehicle 102 is suspended above the ground, then the drive of the drive wheels 23 and 24 will be stopped. Since the drive of the drive wheels 23 and 24 is stopped, the walking assistance moving vehicle 102 will not lurch forward or turn unintentionally even if the drive wheels 23 and 24 should touch the ground.

Figure 21:
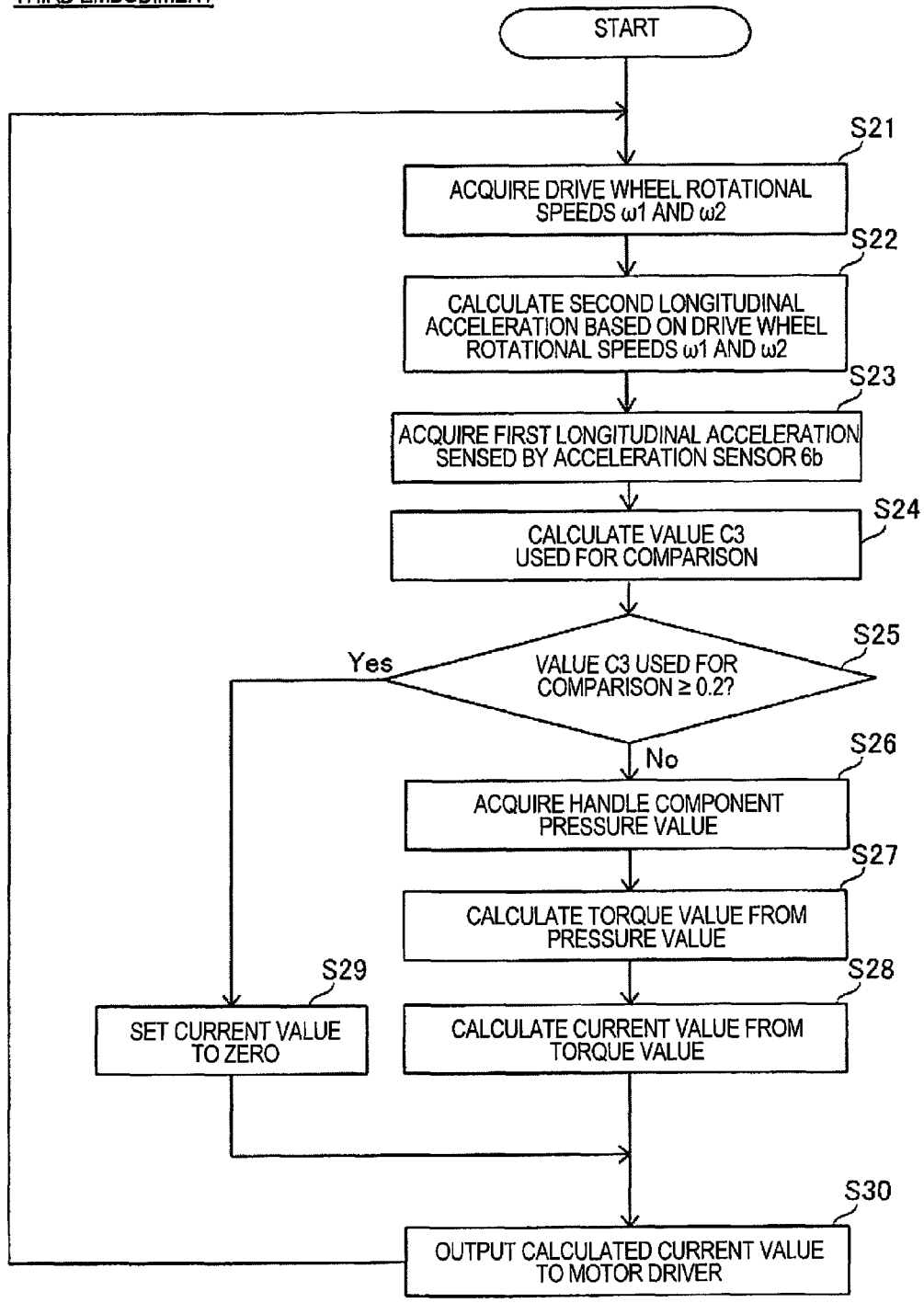
FIG. 21 is a flowchart illustrating drive wheel freewheeling sensing processing for the walking assistance moving vehicle in accordance with the third embodiment.

Next, the flow of sensing the freewheeling of the drive wheels of the walking assistance moving vehicle 102 in the third embodiment will be described through reference to FIG. 21. The processing in the walking assistance moving vehicle 102 is performed by the CPU 5b.

First, in step S21, the drive wheel rotational speeds ω1 and ω2 sensed by the Hall sensors 41 and 42 are acquired. Then, in step S22, the second longitudinal acceleration A6 is calculated based on the acquired drive wheel rotational speeds ω1 and ω2.

Next, in step S23, the first longitudinal acceleration A5 sensed by the acceleration sensor 6b is acquired. In step S24 the value C3 used for comparison is calculated. The flow then proceeds to step S25.

In the third embodiment, in step S25 it is determined whether or not the value based on the absolute difference between the first longitudinal acceleration A5 and the second longitudinal acceleration A6 is equal to or greater than a specific lateral acceleration difference. Specifically, if the value C3 used for comparison is 0.2 or higher, then the flow proceeds to step S29. On the other hand, if the value C3 used for comparison is less than 0.2, the flow proceeds to step S26.

Then, in step S26, information is acquired about the pressure values sensed by the pressure sensors 31 provided to the handle component 3. In step S27, the torque values of the drive wheels 23 and 24 are calculated based on the acquired pressure information. The flow then proceeds to step S28.

In step S28 the current to be sent to the motors 43 and 44 is calculated based on the calculated torque values. The flow then proceeds to step S29.

In the third embodiment, if the value C3 used for comparison is 0.2 or higher in step S25, then the current to be sent to the motors 43 and 44 is set to zero in step S29. The flow then proceeds to step S30.

In step S30, the current value calculated in step S28 or step S29 is outputted to the motor driver 4. After this, the flow returns to step S21 and the drive wheel freewheeling sensing flow is repeated.

The following effect can be obtained with the third embodiment.

The third embodiment, as discussed above, the the walking assistance moving vehicle 102 includes the acceleration sensor 6b that directly senses the first longitudinal acceleration A5, which is the acceleration in the longitudinal direction of the walking assistance moving vehicle main body 1. The CPU 5b indirectly acquires the second longitudinal acceleration A6 of the walking assistance moving vehicle main body 1 based on the drive wheel rotational speeds ω1 and ω2 sensed by the Hall sensors 41 and 42, and performs the second control to decelerate or stop the drive of the drive wheels 23 and 24 without relying on information from the pressure sensors if the value based on the absolute difference between the first longitudinal acceleration A5 and the second longitudinal acceleration A6 is equal to or greater than the specific longitudinal acceleration difference threshold (if the value C3 used for comparison is 0.2 or higher). Consequently, if the value based on the absolute difference between the first longitudinal acceleration A5 and the second longitudinal acceleration A6 is equal to or greater than the specific longitudinal acceleration difference threshold (if the value C3 used for comparison is 0.2 or higher), then it can be concluded that both of the drive wheels 23 and 24 are freewheeling. If both of the drive wheels 23 and 24 are freewheeling, then the drive of the drive wheels 23 and 24 can be decelerated or stopped without relying on information from the pressure sensors 31. As a result, it is less likely that the walking assistance moving vehicle main body 1 will turn in a direction not intended by the user.

The rest of the effect of the walking assistance moving vehicle 102 in accordance with the third embodiment is the same as that of the walking assistance moving vehicle 100 in the first embodiment.

Fourth Embodiment

Figure 22:
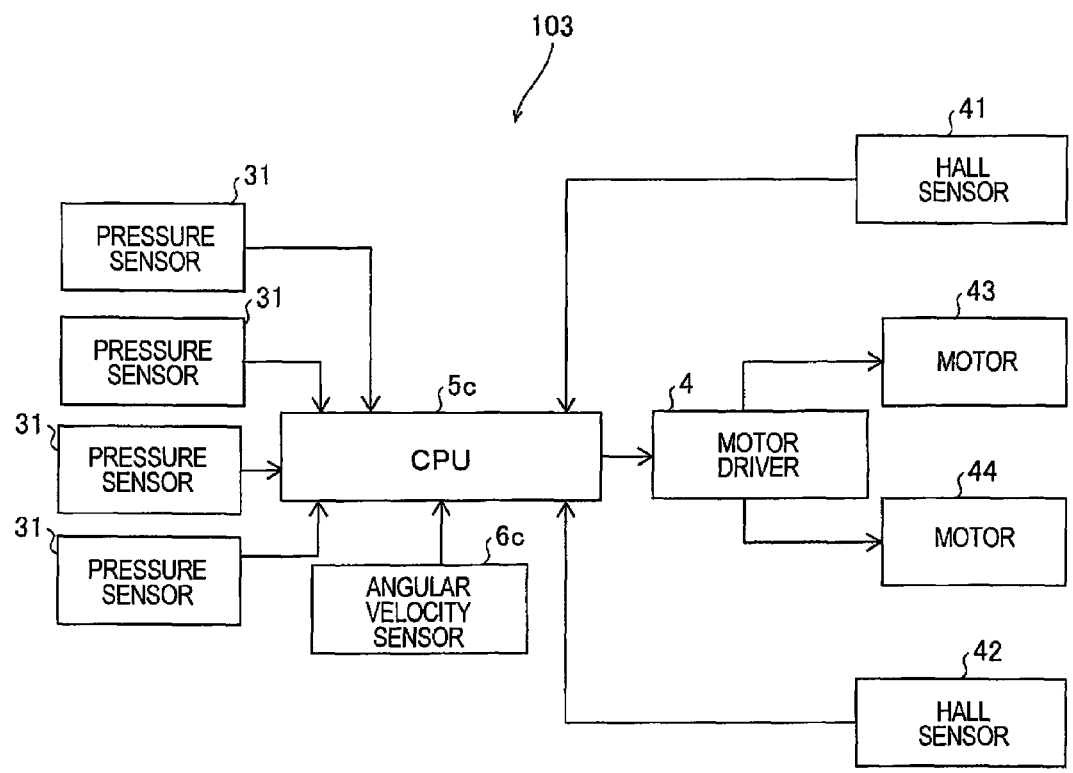
FIG. 22 is a block diagram of the configuration of a walking assistance moving vehicle in accordance with a fourth embodiment.
Figure 23:
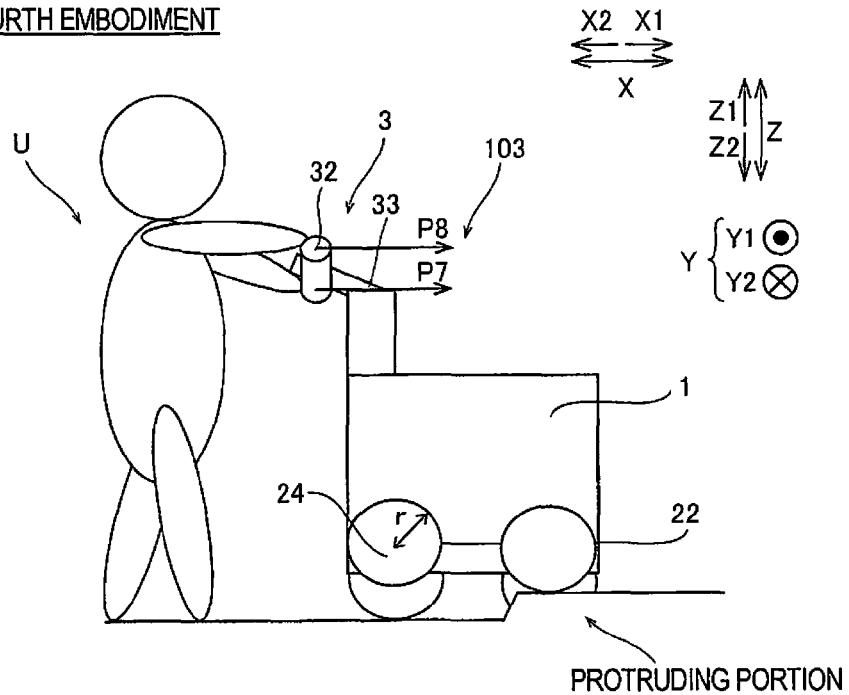
FIG. 23 is a schematic diagram illustrating a freewheeling operation of the walking assistance moving vehicle in accordance with the fourth embodiment.
Figure 24:
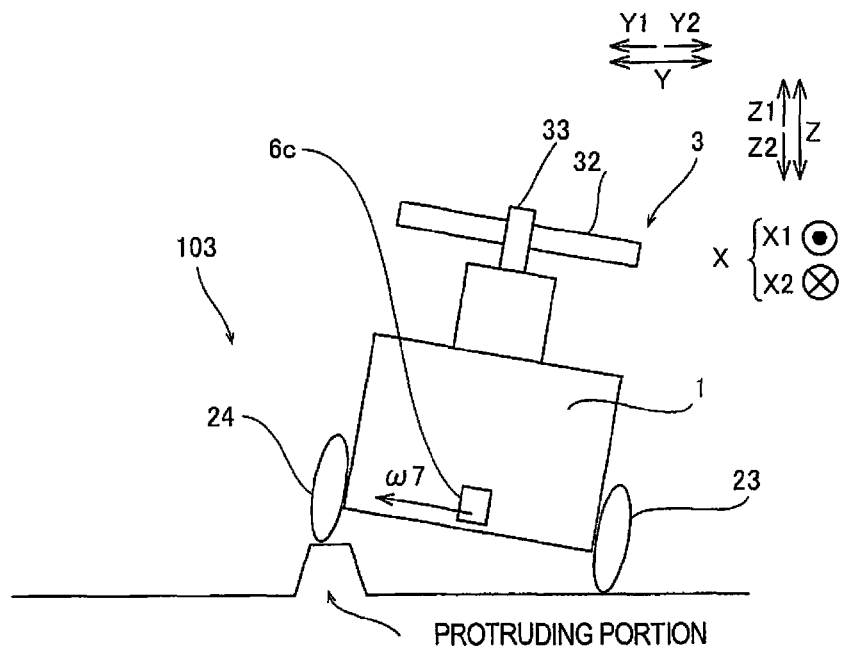
FIG. 24 is a schematic diagram illustrating the freewheeling operation of the walking assistance moving vehicle in accordance with the fourth embodiment.

Referring now to FIGS. 22 to 24, a walking assistance moving vehicle 103 in accordance with a fourth embodiment will now be explained. In view of the similarity between the first to fourth embodiments, the parts of the fourth embodiment that are identical to the parts of the first to third embodiments will be given the same reference numerals as the parts of the first to third embodiments. Moreover, the descriptions of the parts of the fourth embodiment that are identical to the parts of the first to fourth embodiments may be omitted for the sake of brevity. In the first embodiment, the walking assistance moving vehicle 100 has the angular velocity sensor 6 that directly senses only the first turning angular velocity ω3. On the other hand, in this fourth embodiment, the walking assistance moving vehicle 103 has an angular velocity sensor 6c that senses not only the first turning angular velocity ω3, but also an angular velocity ω7 in the roll direction of the walking assistance moving vehicle main body 1. The roll direction is the direction of rotation around an axis along the forward movement direction or the longitudinal direction of the walking assistance moving vehicle 103.

In the fourth embodiment, the angular velocity sensor 6c is provided inside the walking assistance moving vehicle main body 1. The angular velocity sensor 6c also directly senses the roll direction angular velocity ω7 during drive of the walking assistance moving vehicle main body 1. The angular velocity sensor 6c directly senses the roll direction angular velocity ω7 and inputs the sensed information to a CPU 5c.

The CPU 5c performs control to stop the drive of the drive wheels 23 and 24 if the magnitude of the roll direction angular velocity ω1 is equal to or greater than a specific roll angular velocity threshold C4, or if the result of comparing the first turning angular velocity ω3 and the second turning angular velocity ω4 is equal to or greater than a specific turning angular velocity difference threshold (if the value C1 used for comparison is 0.2 or higher).

The rest of the configuration of the walking assistance moving vehicle 103 in accordance with the fourth embodiment is the same as that of the walking assistance moving vehicle 100 in the first embodiment.

The operation of the walking assistance moving vehicle 103 during rolling will now be described through reference to FIGS. 23 and 24.

As shown in FIG. 23, the user U pushes the walking assistance moving vehicle 103 forward from the rear at a pressure P7 on the left side and a pressure P8 on the right side. If the pressure P7 and the pressure P8 are the same, then the CPU 5c controls the motor driver 4 so that the drive wheels 23 and 24 will have the same torque value T1. At this point, the user U wants to move the walking assistance moving vehicle 103 forward. As shown in FIGS. 23 and 24, the caster 22 may rise up above the drive wheel 24 when it rides up over a portion that sticks up above the ground, causing the drive wheel 24 to freewheel. At this point, the torque value of the drive wheel 23 is T1, while the torque value of the drive wheel 24 is zero. As a result, if freewheeling is detected based on only the drive wheel rotational speed as in the conventional vehicle, then the walking assistance moving vehicle 103 will turn to the right-front side, which is a direction not intended by the user U.

On the other hand, in the fourth embodiment, in this case, the magnitude of the roll direction angular velocity ω7 is equal to or greater than the specific roll angular velocity threshold C4, or the comparison result between the first turning angular velocity ω3 and the second turning angular velocity ω4 is equal to or greater than the specific turning angular velocity difference threshold (the value C1 used for comparison is 0.2 or higher). Thus, the drive of the drive wheels 23 and 24 is stopped. Consequently, the CPU 5c stops the drive of the walking assistance moving vehicle 103 by stopping the drive of the drive wheels 23 and 24. As a result, the drive of the walking assistance moving vehicle 103 stops without continuing the turning to the right-front side, which is a direction not intended by the user U.

Figure 25:
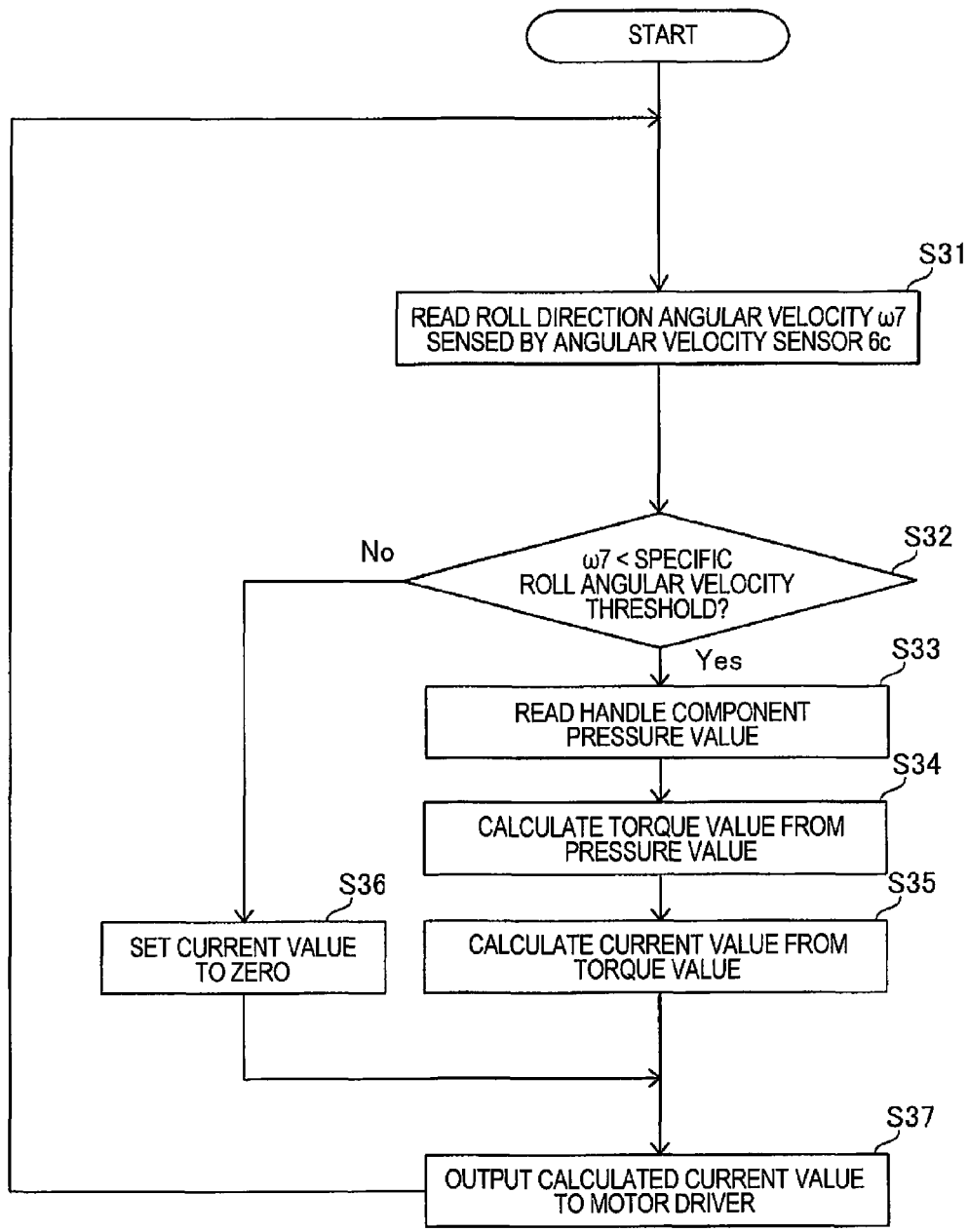
FIG. 25 is a flowchart illustrating drive wheel freewheeling sensing processing for the walking assistance moving vehicle in accordance with the fourth embodiment.

Next, the flow of sensing the freewheeling of the drive wheels 23 and 24 of the walking assistance moving vehicle 103 in the fourth embodiment will be described through reference to FIG. 25. The processing in the walking assistance moving vehicle 103 is performed by the CPU 5c.

First, in step S31, the roll direction angular velocity ω7 sensed by the angular velocity sensor 6c is acquired. Then, in step S32, if the acquired roll direction angular velocity ω7 is less than the specific roll angular velocity threshold C4, then the flow proceeds to step S33. On the other hand, if the acquired roll direction angular velocity ω7 is equal to or greater than the specific roll angular velocity threshold C4, then the flow proceeds to step S36.

Next, in step S33, the pressure value information sensed by the pressure sensors 31 provided to the handle component 3 is acquired. In step S34 the torque values for the drive wheels 23 and 24 are calculated based on the acquired pressure value information. The flow then proceeds to step S35.

Next, in step S35, the current to be sent to the motors 43 and 44 is calculated based on the calculated torque values. The flow then proceeds to step S37.

In the fourth embodiment, if the roll direction angular velocity $\omega 7$ is equal to or greater than the specific roll angular velocity threshold in step S32, then the current to be sent to the motors 43 and 44 is set to zero in step S36. The flow then proceeds to step S37.

In step S37, the current values calculated in step S35 or step S36 are outputted to the motor driver 4. After this, the flow returns to step S31 and the drive wheel freewheeling sensing flow is repeated.

The following effect can be obtained with the fourth embodiment.

The fourth embodiment, as discussed above, the walking assistance moving vehicle 103 includes the angular velocity sensor 6c that directly senses the first turning angular velocity $\omega 3$. The angular velocity sensor 6c directly senses not only the first turning angular velocity $\omega 3$, but also the roll direction angular velocity $\omega 7$, which is the direction of rotation around the axis along the forward movement direction of the walking assistance moving vehicle main body 1. The CPU 5c performs the first control to decelerate or stop the drive of the drive wheels 23 and 24 if the roll direction angular velocity $\omega 7$ is equal to or greater than the specific roll angular velocity threshold C4, or if the result of comparing the first turning angular velocity $\omega 3$ and the second turning angular velocity $\omega 4$ is equal to or greater than the specific turning angular velocity difference threshold. Consequently, freewheeling of the drive wheel 24 can be detected when it occurs as a result of temporary inclination of the walking assistance moving vehicle main body 1c around the axis along the forward movement direction of the walking assistance moving vehicle main body 1c. Thus, a situation in which the walking assistance moving vehicle main body turns in a direction not intended by the user will be effectively made less likely.

The rest of the effect of the walking assistance moving vehicle 103 in accordance with the fourth embodiment is the same as that of the walking assistance moving vehicle 100 in the first embodiment.

The embodiments disclosed herein are just examples in every respect, and should not be interpreted as being limiting in nature. The scope of the invention being indicated by the appended claims rather than by the above description of the embodiments, all modifications within the meaning and range of equivalency of the claims are included.

For example, in the first to fourth embodiments, there are two free wheels (e.g., the casters 21 and 22), but the present invention is not limited to this. With the present invention, there may be just one free wheel, or there may be three or more.

Also, in the first to fourth embodiments, the free wheels (e.g., the casters 21 and 22) are disposed at the front of the walking assistance moving vehicle main body and the drive wheels 23 and 24 are disposed at the rear of the walking assistance moving vehicle main body 1, but the present invention is not limited to this. With the present invention, the free wheels may be disposed at the rear and the drive wheels at the front.

Also, in the first to fourth embodiments, the first control involves stopping the drive wheels 23 and 24, but the present invention is not limited to this. With the present invention, the first control may instead involve decelerating the drive wheels 23 and 24. For example, the control may be performed to lower the torque of the drive wheels 23 and 24 generated with respect to the pressure with which the user U pushes or pulls the grip component 32 sensed by the pressure sensors 31 to one-tenth relative to the torque when the wheels are not freewheeling.

Also, in the first to third embodiments, the specific turning angular velocity difference threshold, the specific lateral acceleration difference threshold, and the specific longitudinal acceleration difference threshold are set to 0.2, but the present invention is not limited to this. With the present invention, the value used for comparison may be something other than 0.2, such as 0.3 or 0.1.

Also, in the first to fourth embodiments, either an angular velocity sensor or an acceleration sensor is provided, but the present invention is not limited to this. With the present invention, both an angular velocity sensor and an acceleration sensor may be provided.

Also, in the first to fourth embodiments, four pressure sensors 31 including electroconductive rubber, etc., are provided, but the present invention is not limited to this. With the present invention, two metal pressure sensors or the like that sense the pressure during compression and tension may be used.

Also, in the first to fourth embodiments, the Hall sensors 41 and 42 are used as the drive wheel rotational speed sensors, but the present invention is not limited to this. With the present invention, a resolver, a rotary encoder, or another such drive wheel rotational speed sensor may be used instead.

Also, in the first to fourth embodiments, these embodiments are individually configured, but the present invention is not limited to this. With the present invention, the first to fourth embodiments may also be combined.

Also, in the first to fourth embodiments, for the sake of convenience, the description is provided using a flow driven flowchart in which the processing of the controller of the present invention is performed sequentially along with the processing flow, but the present invention is not limited to this. With the present invention, the processing operation of the controller may be accomplished by event driven processing in which processing is executed for each event. In this case, the processing may be completely event driven, or may be a combination of event driven and flow driven.

Also, in the first embodiment, in step S5, it is determined whether or not the value based on the absolute difference between the first turning angular velocity $\omega 3$ and the second turning angular velocity $\omega 4$ is equal to or greater than a specific turning angular velocity difference. However, in step S5, it can also be determined whether or not the absolute difference between the first turning angular velocity $\omega 3$ and the second turning angular velocity $\omega 4$ is equal to or greater than a specific turning angular velocity difference. Similarly, in the second embodiment, in step S15, it is determined whether or not the value based on the absolute difference between the first lateral acceleration A1 and the second lateral acceleration A2 is equal to or greater than a specific lateral acceleration difference. However, in step S15, it can also be determined whether or not the absolute difference between the first lateral acceleration A1 and the second lateral acceleration A2 is equal to or greater than a specific lateral acceleration difference. Also, in the third embodiment, in step S25, it is determined whether or not the value based on the absolute difference between the first longitudinal acceleration A5 and the second longitudinal acceleration A6 is equal to or greater than a specific lateral acceleration difference. However, it can also be determined whether or not the absolute difference between the first longitudinal acceleration A5 and the second longitudinal acceleration A6 is equal to or greater than a specific lateral acceleration difference.

The walking assistance moving vehicle in accordance with one aspect of the present invention includes a walking assistance moving vehicle main body with a pair of drive wheels, a drive wheel rotational speed sensor, a turning sensor, and a controller. The walking assistance moving vehicle main body is configured to assist walking of a user. The drive wheel rotational speed sensor is configured to sense drive wheel rotational speed of each of the drive wheels. The turning sensor is configured to directly sense at least one of a first lateral acceleration and a first turning angular velocity during turning of the walking assistance moving vehicle main body. The controller is configured to indirectly acquire at least one of a second lateral acceleration and a second turning angular velocity of the walking assistance moving vehicle main body based on the drive wheel rotational speed sensed by the drive wheel rotational speed sensor. The controller is further configured to perform a first control to decelerate or stop drive of the two drive wheels based on a comparison of the first turning angular velocity and the second turning angular velocity or a comparison of the first lateral acceleration and the second lateral acceleration.

The walking assistance moving vehicle in accordance with this aspect of the present invention, as mentioned above, includes the drive wheel rotational speed sensor configured to sense the drive wheel rotational speed of each of the drive wheels, the turning sensor configured to directly sense at least one of the first lateral acceleration and the first turning angular velocity during turning of the walking assistance moving vehicle main body, and the controller configured to indirectly acquire at least one of the second lateral acceleration and the second turning angular velocity of the walking assistance moving vehicle main body based on the drive wheel rotational speed sensed by the drive wheel rotational speed sensor, and configured to perform the first control to decelerate or stop the drive of the drive wheels based on the comparison of the first turning angular velocity and the second turning angular velocity or the comparison of the first lateral acceleration and the second lateral acceleration. Consequently, unlike when freewheeling is detected only by the drive wheel rotational speed sensor, at least one of the first turning angular velocity and first lateral acceleration during turning of the walking assistance moving vehicle main body is indirectly sensed by the turning sensor. Thus, a state in which one of the drive wheels is freewheeling can be distinguished from a state in which the walking assistance moving vehicle main body is turning. The control is performed to decelerate or stop the drive of the drive wheels if one of the drive wheels is freewheeling. Thus, it will be less likely that the walking assistance moving vehicle main body will turn in a direction not intended by the user. As a result, freewheeling of the drive wheels can be accurately detected. This makes it less likely that the walking assistance moving vehicle main body will turn in a direction not intended by the user.

With the walking assistance moving vehicle in accordance with the above aspect, the walking assistance moving vehicle further includes an assist force adjustment degree sensor configured to sense a degree of adjustment of assist force inputted by the user. The controller is further configured to drive the drive wheels based on information from the assist force adjustment degree sensor. The controller is further configured to perform the first control regardless of the information from the assist force adjustment degree sensor in response to a value based on absolute difference between the first turning angular velocity and the second turning angular velocity being equal to or greater than a specific turning angular velocity difference threshold, or in response to a value based on absolute difference between the first lateral acceleration and the second lateral acceleration being equal to or greater than a specific lateral acceleration difference threshold. With this configuration, if the value based on the absolute difference between the first turning angular velocity and the second turning angular velocity is equal to or greater than the specific turning angular velocity difference threshold, or if the value based on the absolute difference between the first lateral acceleration and the second lateral acceleration is equal to or greater than the specific lateral acceleration difference threshold, then it can be determined that one of the drive wheels is freewheeling. If one of the drive wheels is freewheeling, then the drive of the two drive wheels can be decelerated or stopped regardless of the information from the assist force adjustment degree sensor. Thus, it is less likely that the walking assistance moving vehicle main body will turn in a direction not intended by the user.

In this case, the controller is further configured to stop the drive of the drive wheels in response to the value based on the absolute difference between the first turning angular velocity and the second turning angular velocity being equal to or greater than the specific turning angular velocity difference threshold, or in response to the value based on the absolute difference between the first lateral acceleration and the second lateral acceleration being equal to or greater than the specific lateral acceleration difference threshold. With this configuration, the drive of the drive wheels is stopped if it is determined that one of the drive wheels is freewheeling. Thus, it is even less likely that the walking assistance moving vehicle main body will turn in a direction not intended by the user.

With the configuration having the above-mentioned assist force adjustment degree sensor, the walking assistance moving vehicle further includes a longitudinal acceleration sensor configured to directly sense a first longitudinal acceleration in a longitudinal direction of the walking assistance moving vehicle main body. The controller is further configured to indirectly acquire a second longitudinal acceleration of the walking assistance moving vehicle main body based on the drive wheel rotational speed sensed by the drive wheel rotational speed sensor. The controller is further configured to perform a second control to decelerate or stop the drive of the drive wheels regardless of the information from the assist force adjustment degree sensor in response to a value based on absolute difference between the first longitudinal acceleration and the second longitudinal acceleration is equal to or greater than a specific longitudinal acceleration difference threshold. With this configuration, both of the drive wheels are determined to be freewheeling if the value based on the absolute difference between the first longitudinal acceleration and the second longitudinal acceleration is equal to or greater than the specific longitudinal acceleration difference threshold. Consequently, if both of the drive wheels are freewheeling, then the drive of the drive wheels can be decelerated or stopped without relying on the information from the assist force adjustment degree sensor. As a result, a situation in which the walking assistance moving vehicle main body turns in a direction not intended by the user can be effectively made less likely to occur.

In this case, the controller is further configured to stop the drive of the drive wheels in response to the value based on the absolute difference between the first longitudinal acceleration and the second longitudinal acceleration is equal to or greater than the specific longitudinal acceleration difference threshold. With this configuration, if it is determined that both of the drive wheels are freewheeling, then the drive of the drive wheels can be stopped. Thus, it is even less likely that the walking assistance moving vehicle main body will turn in a direction not intended by the user.

With the walking assistance moving vehicle in accordance with the above aspect, the turning sensor includes an angular velocity sensor that is configured to directly sense the first turning angular velocity and an angular velocity in a roll direction about an axis along a longitudinal direction of the walking assistance moving vehicle main body. The controller is further configured to perform the first control to decelerate or stop the drive of the drive wheels based on the angular velocity in the roll direction and the comparison of the first turning angular velocity and the second turning angular velocity. Also, the controller is further configured to perform the first control to decelerate or stop the drive of the drive wheels in response to the angular velocity in the roll direction being equal to or greater than a specific roll angular velocity threshold. With this configuration, freewheeling of the drive wheels can be detected when it occurs as a result of temporary inclination of the walking assistance moving vehicle main body around the axis along the longitudinal direction of the walking assistance moving vehicle main body. Thus, a situation in which the walking assistance moving vehicle main body turns in a direction not intended by the user will be effectively made less likely.

With the configuration having the above-mentioned assist force adjustment degree sensor, the assist force adjustment degree sensor includes a plurality of pressure sensors that is configured to sense drive force of the user to the walking assistance moving vehicle main body and a drive direction of the drive force in response to a drive operation of the user. The controller is further configured to drive the drive wheels in the drive direction based on information from the plurality of pressure sensors. The controller being further configured to perform the first control regardless of the information from the pressure sensors in response to the value based on the absolute difference between the first turning angular velocity and the second turning angular velocity being equal to or greater than the specific turning angular velocity difference threshold, or in response to the value based on the absolute difference between the first lateral acceleration and the second lateral acceleration being equal to or greater than the specific lateral acceleration difference threshold. With this configuration, the drive force of the user and the drive direction of the drive force can be sensed by comparing the sensing values of the pressure sensors.

As discussed above, the present invention provides a walking assistance moving vehicle with which freewheeling of drive wheels is accurately detected, making it less likely that the walking assistance moving vehicle main body will turn in a direction not intended by the user.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a walking assistance moving vehicle in an upright position. Accordingly, these directional terms, as utilized to describe the walking assistance moving vehicle should be interpreted relative to a walking assistance moving vehicle in an upright position on a horizontal surface. The terms "left" and "right" are used to indicate the "right" when referencing from the right side as viewed from the rear of the walking assistance moving vehicle, and the "left" when referencing from the left side as viewed from the rear of the walking assistance moving vehicle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A walking assistance moving vehicle comprising:
   a walking assistance moving vehicle main body with a pair of drive wheels, the walking assistance moving vehicle main body being configured to assist walking of a user;
   a drive wheel rotational speed sensor configured to sense drive wheel rotational speed of each of the drive wheels;

a turning sensor configured to directly sense at least one of a first lateral acceleration and a first turning angular velocity during turning of the walking assistance moving vehicle main body; and a controller configured to indirectly acquire at least one of a second lateral acceleration and a second turning angular velocity of the walking assistance moving vehicle main body based on the drive wheel rotational speed sensed by the drive wheel rotational speed sensor, the controller being further configured to perform a first control to decelerate or stop drive of the drive wheels based on a comparison of the first turning angular velocity and the second turning angular velocity or a comparison of the first lateral acceleration and the second lateral acceleration.

2. The walking assistance moving vehicle according to claim 1, further comprising an assist force adjustment degree sensor configured to sense a degree of adjustment of assist force inputted by the user, the controller being further configured to drive the drive wheels based on information from the assist force adjustment degree sensor, the controller being further configured to perform the first control regardless of the information from the assist force adjustment degree sensor in response to a value based on absolute difference between the first turning angular velocity and the second turning angular velocity being equal to or greater than a specific turning angular velocity difference threshold, or in response to a value based on absolute difference between the first lateral acceleration and the second lateral acceleration being equal to or greater than a specific lateral acceleration difference threshold.

3. The walking assistance moving vehicle according to claim 2, wherein the controller is further configured to stop the drive of the drive wheels in response to the value based on the absolute difference between the first turning angular velocity and the second turning angular velocity being equal to or greater than the specific turning angular velocity difference threshold, or in response to the value based on the absolute difference between the first lateral acceleration and the second lateral acceleration being equal to or greater than the specific lateral acceleration difference threshold.

4. The walking assistance moving vehicle according to claim 2, further comprising a longitudinal acceleration sensor configured to directly sense a first longitudinal acceleration in a longitudinal direction of the walking assistance moving vehicle main body, the controller being further configured to indirectly acquire a second longitudinal acceleration of the walking assistance moving vehicle main body based on the drive wheel rotational speed sensed by the drive wheel rotational speed sensor, the controller being further configured to perform a second control to decelerate or stop the drive of the drive wheels regardless of the information from the assist force adjustment degree sensor in response to a value based on absolute difference between the first longitudinal acceleration and the second longitudinal acceleration is equal to or greater than a specific longitudinal acceleration difference threshold.

5. The walking assistance moving vehicle according to claim 4, wherein the controller is further configured to stop the drive of the drive wheels in response to the value based on the absolute difference between the first longitudinal acceleration and the second longitudinal acceleration is equal to or greater than the specific longitudinal acceleration difference threshold.

6. The walking assistance moving vehicle according to claim 1, wherein the turning sensor includes an angular velocity sensor that is configured to directly sense the first turning angular velocity and an angular velocity in a roll direction about an axis along a longitudinal direction of the walking assistance moving vehicle main body, and the controller is further configured to perform the first control to decelerate or stop the drive of the drive wheels based on the angular velocity in the roll direction and the comparison of the first turning angular velocity and the second turning angular velocity.

7. The walking assistance moving vehicle according to claim 6, wherein the controller is further configured to perform the first control to decelerate or stop the drive of the drive wheels in response to the angular velocity in the roll direction being equal to or greater than a specific roll angular velocity threshold.

8. The walking assistance moving vehicle according to claim 2, wherein the assist force adjustment degree sensor includes a plurality of pressure sensors that is configured to sense drive force of the user to the walking assistance moving vehicle main body and a drive direction of the drive force in response to a drive operation of the user, and the controller is further configured to drive the drive wheels in the drive direction based on information from the pressure sensors, the controller being further configured to perform the first control regardless of the information from the pressure sensors in response to the value based on the absolute difference between the first turning angular velocity and the second turning angular velocity being equal to or greater than the specific turning angular velocity difference threshold, or in response to the value based on the absolute difference between the first lateral acceleration and the second lateral acceleration being equal to or greater than the specific lateral acceleration difference threshold.

* * * * *